(12) United States Patent  
Valle et al.

(10) Patent No.: US 9,162,729 B2  
(45) Date of Patent: *Oct. 20, 2015

(54) RIGHT CRANK ARM ASSEMBLY FOR A BICYCLE AND CRANK ARM THEREOF

(71) Applicant: CAMPAGNOLO, S.R.L., Vicenza (IT)

(72) Inventors: Maurizio Valle, Vicenza (IT); Paolo Pasqua, Camisano Vicentino (IT)

(73) Assignee: Campagno S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,748

(22) Filed: Sep. 30, 2013

(65) Prior Publication Data

US 2014/0047946 A1    Feb. 20, 2014

Related U.S. Application Data

(63) Continuation of application No. 11/832,215, filed on Aug. 1, 2007, now Pat. No. 8,573,093.

(30) Foreign Application Priority Data

Aug. 3, 2006   (IT) .............................. MI2006A1550

(51) Int. Cl.
*B62M 3/00* (2006.01)
*B62M 9/10* (2006.01)

(52) U.S. Cl.
CPC ................. *B62M 3/00* (2013.01); *B62M 9/105* (2013.01); *Y10T 74/2164* (2015.01); *Y10T 74/2165* (2015.01)

(58) Field of Classification Search
CPC ........ B62M 3/00; B62M 3/003; B62M 9/105; Y10T 74/2164; Y10T 74/2165
USPC ............ 74/594.1, 594.2, 594.3; 474/158, 160
IPC .................................................. B62M 3/00, 9/10
See application file for complete search history.

(56) References Cited

U.S. PATENT DOCUMENTS

| | | | |
|---|---|---|---|
| 4,009,621 A | 3/1977 | Segawa |
| 4,318,310 A | 3/1982 | Segawa |
| 4,425,824 A | 1/1984 | Koch |
| 4,439,172 A | 3/1984 | Segawa |

(Continued)

FOREIGN PATENT DOCUMENTS

| | | |
|---|---|---|
| DE | 04242310 A1 | 1/1994 |
| DE | 19717463 | 10/1998 |

(Continued)

*Primary Examiner* — Thomas Diaz
(74) *Attorney, Agent, or Firm* — Volpe and Koenig, P.C.

(57) ABSTRACT

A right crank arm assembly for a bicycle, comprises a right crank arm, a first annular element directly coupled with said crank arm at at least one first coupling portion of said first annular element and at least one second annular element coupled with said crank arm and of a smaller size than said first annular element. The first annular element comprises a toothing that extends radially towards the outside along a primitive circumference having a predetermined diameter. Said at least one first coupling portion is entirely contained in a first area extending radially towards the outside starting from an ideal circumference having a diameter at least equal to ⅔ of said predetermined diameter. Such an annular element constitutes the front sprocket of the crank arm assembly of the present invention and consists of a simple toothed band. Such a front sprocket is particularly light in weight.

47 Claims, 17 Drawing Sheets

(56) References Cited

U.S. PATENT DOCUMENTS

| | | |
|---|---|---|
| 4,594,910 A | 6/1986 | Nagano |
| 4,850,245 A | 7/1989 | Feamster et al. |
| 4,898,047 A | 2/1990 | Cropek |
| 5,242,028 A | 9/1993 | Murphy et al. |
| 5,893,299 A | 4/1999 | Yamanaka |
| 6,024,662 A | 2/2000 | Fujimoto |
| 8,573,093 B2 * | 11/2013 | Valle et al. .......... 74/594.2 |

FOREIGN PATENT DOCUMENTS

| | | |
|---|---|---|
| EP | 0386685 A2 | 9/1990 |
| EP | 0791532 A2 | 8/1997 |
| EP | 0849153 A1 | 6/1998 |
| EP | 1074462 A2 | 2/2001 |
| EP | 1134154 A2 | 9/2001 |
| EP | 1609714 A2 | 12/2005 |
| GB | 2109892 | 6/1983 |
| JP | 29015234 UB | 11/1955 |
| JP | 3033646 UB | 1/1997 |
| JP | 10181662 A | 7/1998 |
| JP | 2005053410 A | 3/2005 |
| JP | 2006160139 A | 6/2006 |
| TW | 236991 | 12/1994 |
| TW | 590955 | 6/2004 |
| TW | I250107 | 3/2006 |
| WO | 8902626 A1 | 3/1989 |

* cited by examiner

RIGHT CRANK ARM ASSEMBLY FOR A BICYCLE AND CRANK ARM THEREOF

CROSS REFERENCE TO RELATED APPLICATION

This application is a continuation application of U.S. patent application Ser. No. 11/832,215, which was filed Aug. 1, 2007 and issued on Nov. 5, 2013 as U.S. Pat. No. 8,573,093 and is incorporated by reference as if fully set forth.

FIELD OF INVENTION

The present invention relates to a right crank arm assembly and right crank arm for a bicycle.

BACKGROUND

Typically, in the field of bicycles, the expression "right crank arm assembly" is used to indicate an assembly comprising a right crank arm and at least one front sprocket coupled with the right crank arm. The front sprocket, in particular, is the toothed wheel adapted to drive the chain of the bicycle for the motion transmission to the rear wheel of the bicycle, such motion being imparted by the cyclist through pedaling.

Right crank arm assemblies are known in which the front sprocket is directly coupled with the right crank arm.

Right crank arm assemblies are also known in which the front sprocket is coupled with the right crank arm through the interposition of an adapter disc made of a light material.

The present invention relates in particular to a right crank arm assembly in which the front sprocket is directly coupled with the right crank arm. In particular, this kind of right crank arm assemblies are heavier than those comprising an adapter, which is a drawback for a professional use.

SUMMARY

The present assembly refers, in a first aspect thereof, to a right crank arm assembly for a bicycle, comprising a right crank arm, a first annular element directly coupled with said crank arm at at least one first coupling portion of said first annular element and at least one second annular element coupled with said crank arm and of a smaller size than said first annular element, wherein said first annular element comprises a toothing that extends radially towards the outside along a primitive circumference having a predetermined diameter, wherein said at least one first coupling portion is entirely contained in a first area extending radially towards the outside starting from an ideal circumference having a diameter at least equal to $2/3$ of said predetermined diameter.

Advantageously, in the assembly, the annular element, which acts as a big front sprocket, has a simple toothed band possibly provided with coupling elements with the crank arm having a very short radial extension. In this way a substantial saving in weight of the element that constitutes the big front sprocket and, therefore, of the right crank arm assembly is obtained. Such a saving in weight is particularly significant in the case in which the crank arm is made from light metallic material or, preferably, from composite material.

BRIEF DESCRIPTION OF THE DRAWINGS

Further characteristics and advantages described herein shall become clearer from the following detailed description of some preferred embodiments thereof, made with reference to the attached drawings. In such drawings.

DETAILED DESCRIPTION OF THE PREFERRED EMBODIMENTS

Introduction

Figure 1:
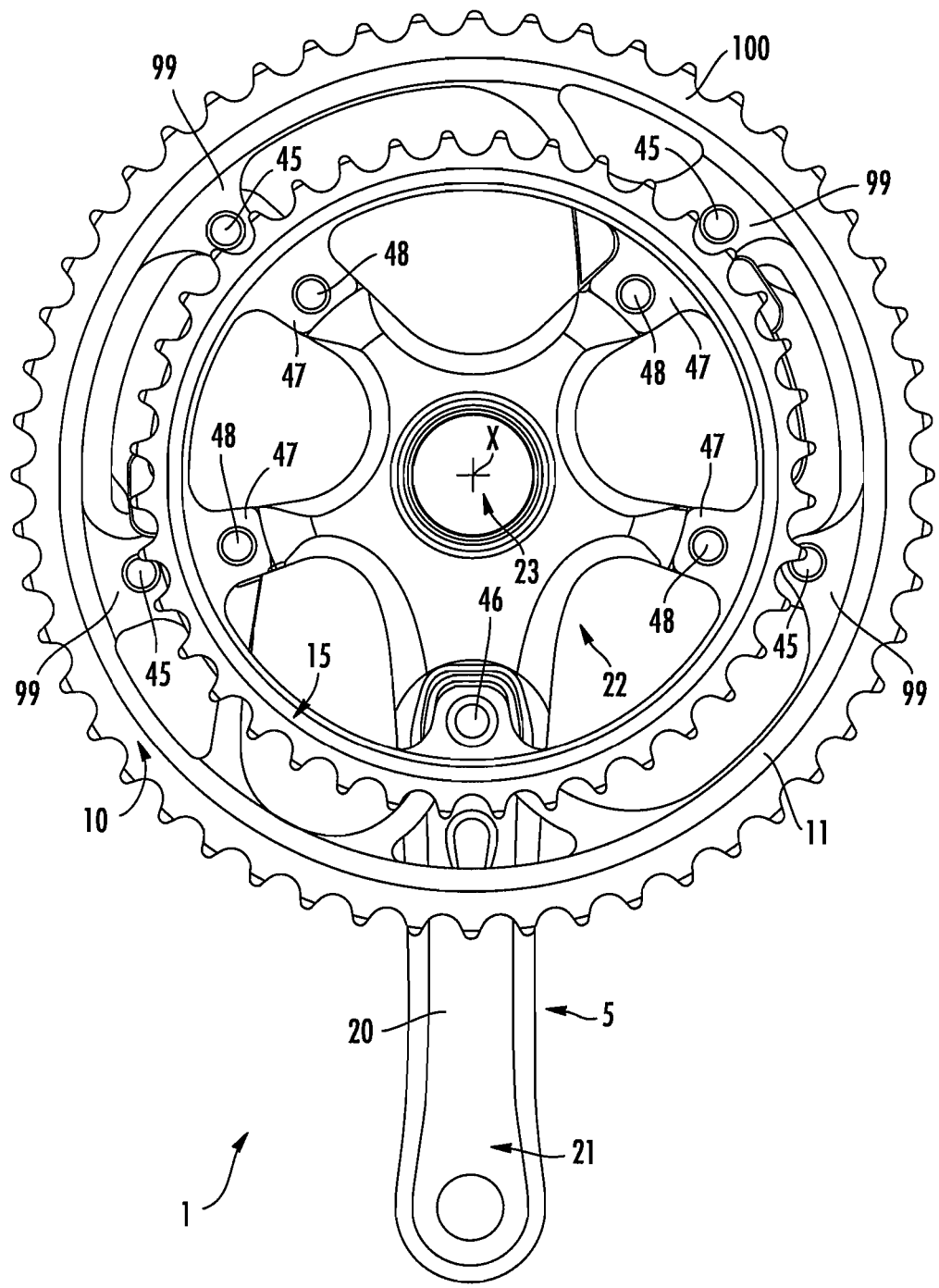
FIG. 1 is a front view from the inner side of a right crank arm assembly according to the present invention, comprising a combination of standard front sprockets.

Throughout the present description and in the subsequent claims indistinct use shall be made of the expression "annular element" or "toothed band" or "front sprocket" to indicate the component of the assembly described herein that in the right crank arm assemblies of the prior art corresponds to the toothed front sprocket.

Preferably, the aforementioned ideal circumference has a diameter at least equal to $3/4$ of said predetermined diameter, more preferably at least equal to $4/5$ of said predetermined diameter, more preferably at least equal to $5/6$ of said predetermined diameter, more preferably at least equal to $6/7$ of said predetermined diameter. In this way the desired lightening in weight of the annular element that constitutes the big front sprocket is obtained, at the same time ensuring a good coupling between annular element and crank arm.

In a first embodiment of the assembly described herein, said at least one first coupling portion is defined by at least one first coupling element that extends radially cantilevered from a radially inner surface of the first annular element up to said ideal circumference.

In this embodiment, preferably, said first annular element comprises at least one first contact element with the crank arm which is structurally distinct from said at least one first coupling element, said at least one first contact element also extending and being entirely contained in the aforementioned area.

Advantageously, the provision in the annular element of contact elements which are structurally distinct from the coupling elements allows a contact of the annular element on the crank arm to be achieved that is more stable and effective than what occurs in assemblies of the prior art, where the contact between front sprocket and crank arm only occurs at the coupling elements of the front sprocket with the crank arm. In this way it is possible to limit the deformation of the annular element during pedaling, with a consequent advantage in terms of motion transmission. Even more advantageously, these contact elements also have a limited radial extension, thus contributing to the lowering of the weight of the annular element and, therefore, of the assembly described herein.

More preferably, said at least one first contact element extends from said radially inner surface to an angular position of said first annular element different to that of said at least one first coupling element.

Preferably, said at least one first contact element extends along a non-radial direction with respect to a rotation axis of said first annular element. Advantageously, unlike assemblies of the prior art where the contact between front sprocket and crank arm only occurs at the ends of the arms of the crank arm and of the coupling elements extending radially with respect to the rotation axis of the assembly, in the assembly described herein the contact between annular element and crank arm occurs at respective surfaces having a greater extension. The desired stability and effectiveness of the contact is thus ensured.

More preferably, said at least one first contact element extends at least partially circumferentially around said rotation axis along an arc of circumference having a predetermined angular extension.

In a first embodiment of the annular element of the right crank arm assembly described herein, said angular extension is equal to 360°.

In a second embodiment of the annular element of the right crank arm assembly described herein, said angular extension is less than 360° and preferably more than 15°, more preferably between 15° and 100°, even more preferably between 30° and 75°.

In the preferred embodiment of the right crank arm assembly described herein, said first annular element comprises a plurality of first coupling elements and said at least one first contact element extends circumferentially without structural interruption between two adjacent coupling elements of said plurality of first coupling elements.

In the assembly described herein, the crank arm has an inner side intended, in use, to face towards the frame of the bicycle and an outer side opposite said inner side and said at least one first contact element is preferably active on said crank arm on one of said sides.

Preferably, said annular element also comprises at least one second contact element active on said crank arm on the other of said sides.

Advantageously, the provision in the annular element of elements adapted to act in contact with the two opposite sides of the crank arm effectively blocks the twisting deformation of the annular element during pedaling, to the great advantage of the transmission efficiency of the motion imparted through the right crank arm assembly described herein. The Applicant has indeed observed that, in operation, conventional front sprockets elastically deform due to the stresses to which they are subjected during pedaling. Such a deformation leads to a decrease in transmission efficiency of the motion imparted through the crank arm assembly. In particular, the crank arm transmits the force that the cyclist exerts upon the pedals of the bicycle to the front sprocket. Such a force acts in a plane parallel to the middle plane of the front sprocket and its direction of application and the intensity change at each angular position of the pedal. This stress therefore causes a variable lateral flexing deformation of the front sprocket. Considering also that the chain exerts a force resisting the forward movement of the front sprocket on a portion of the front sprocket, the resulting stress on the front sprocket is a twisting stress. Therefore, the consequent deformation of the front sprocket is a twisting deformation. The Applicant has also found that, during pedaling, the front sprocket twists on different sides from one point to another, and therefore has thought to position contact elements with the crank arm at both sides of the crank arm.

Preferably, said at least one second contact element extends cantilevered from said radially inner surface of said first annular element on the opposite side to said at least one first contact element with respect to said at least one first coupling element.

The Applicant has indeed found that the front sprocket of conventional assemblies twists on opposite sides before and after each coupling element with the crank arm, and has therefore thought to position the contact elements on the opposite side to each coupling element. In particular, the contact elements are only positioned where they actually perform their counteraction to the twisting deformation of the annular element, i.e. just at the side of the annular element in which it twists during pedalling. In this way a substantially saving of weight is obtained in addition to an excellent result in terms of prevention of twisting deformation of the annular element.

Preferably, said at least one second contact element extends from said radially inner surface of said first annular element along a substantially radial direction.

In the preferred embodiment of the front sprocket of the right crank arm assembly described herein, said at least one second contact element is arranged in a position that precedes said at least one first coupling portion with reference to the direction of rotation of the crank arm assembly during pedaling and said at least one first contact element is arranged in a position that follows said at least one first coupling portion with reference to said direction of rotation. The Applicant has indeed found that such a geometry provides an effective opposition to the deformation of the annular element during pedaling.

In a first embodiment of the assembly described herein, said at least one first contact element and at least one second contact element are defined in a body portion of said first annular element extending radially cantilevered from said radially inner surface and comprising said at least one first coupling element.

In a second embodiment of the assembly described herein, said at least one second contact element is defined by a respective body portion of said first annular element extending radially cantilevered from said radially inner surface, said respective body portion not comprising said at least one first coupling element.

Preferably, said first annular element comprises at least one abutment surface adapted to allow the correct angular positioning of said crank arm with respect to said first annular element.

More preferably, said at least one abutment surface is defined at least partially in said at least one second contact element. Advantageously, it is in this way possible to achieve the correct angular positioning of the crank arm with respect to the annular element without needing to provide special abutment elements on the annular element.

In the preferred embodiment thereof, the annular element of the assembly described herein comprises a plurality of first contact elements and a plurality of second contact elements. In particular, the contact elements are preferably at least two per side, possibly four, but this does not exclude embodiment with a different, even odd, number of contact elements. Advantageously, the provision of many contact elements per side allows a contact between crank arm and annular element to be obtained that is particularly stable and effective in blocking the twisting deformation of the annular element.

Preferably, the assembly described herein further comprises at least one first crank arm element adapted to cooperate with said at least one first contact element and at least one second crank arm element adapted to cooperate with said at least one second contact element.

Preferably, said at least one first crank arm element has an angular extension substantially equal to that of said at least one first contact element.

In a specific embodiment thereof, said first annular element is coupled with said crank arm at at least one first coupling portion of said crank arm and said at least one second annular element is coupled with said crank arm at at least one second coupling portion of said crank arm different to said first coupling portion. Advantageously, the provision on the crank arm of different coupling portions for the different annular elements makes the removal of the annular elements for possible repairs or replacement quicker and easier. This cannot be achieved in assemblies of the prior art wherein all of the front sprockets are coupled with the crank arms at the same coupling portions of the crank arm.

Preferably, said at least one first coupling portion of said crank arm is defined at a first circumference having its centre at the rotation axis of said crank arm and said at least one second coupling portion of said crank arm is defined at at least one second circumference concentric to said first circumference and having a different diameter to that of said first circumference. Advantageously, the provision of annular elements of different diameter coupled with different coupling portions of the crank arm allows a large number of combinations of annular elements of different size to be made, such combinations also comprising annular elements of very small or very large diameter. Regarding this, it should be noted that, in conventional assemblies, the only combinations used are those known as "standard", comprising small front sprockets with a number of teeth of between 38 and 44 and large front sprockets with a number of teeth of between 52 and 56, and "compact", comprising small front sprockets with a number of teeth of between 32 and 36 and large front sprockets with a number of teeth of between 46 and 50. The assembly described herein, on the other hand, allows different combinations to "standard" or "compact" to be adopted, like for example mixed combinations.

The Applicant has also found that, in conventional crank arms, the arms are sized to give the maximum resistance to twisting in combination with front sprockets of predetermined size. The result of this is that, in the case in which the cyclist intends to use front sprockets of different sizes and wants to maintain an acceptable structural rigidity, he is forced to replace also the right crank arm. This, as well as constituting a trouble for the cyclist, implies that the crank arm manufacturer needs to design, produce and commercialize crank arms of different sizes.

Advantageously, with an assembly like the one described herein in which annular elements of different diameter are coupled at different coupling portions of the crank arm, it is no longer necessary to produce different sized crank arm for each combination of annular elements intended to be used, nor does the cyclist have to change crank arm each time he changes the combination of annular elements in order to be able to maintain the desired structural rigidity. The assembly is therefore advantageous both for the cyclist and for the crank arm manufacturer.

More preferably, said at least one first coupling portion of said crank arm is defined along at least one first substantially radial direction with respect to said rotation axis of the crank arm and said at least one second coupling portion of said crank arm is defined along at least one second substantially radial direction of said crank arm different to said first substantially radial direction of said crank arm.

Preferably, said crank arm comprises at least two first coupling portions arranged at a first predetermined angular distance one from the other and at least two second coupling portions arranged at a second predetermined angular distance one from the other, said second predetermined angular distance being less than said first predetermined angular distance.

Preferably, said first area is a first annular area located between said ideal circumference and a second ideal circumference arranged at least 1 mm radially towards the inside with respect to said toothing.

More preferably, said first annular area has an inner diameter greater than or equal to 150 mm and an outer diameter less than or equal to 180 mm. Even more preferably, said first annular area has an inner diameter greater than or equal to 160 mm and an outer diameter less than or equal to 170.

Preferably, the assembly described herein comprises a second annular area containing said at least one second coupling portion of said crank arm and having an inner diameter greater than or equal to 100 mm and an outer diameter less than or equal to 130 mm.

Preferably, said second annular area has an inner diameter greater than or equal to 110 mm and an outer diameter less than or equal to 120 mm.

In a variant of the assembly described herein, the aforementioned at least one coupling portion is defined by said radially inner surface. In this case, preferably, the aforementioned radially inner surface is arranged at least 1 mm radially towards the inside with respect to said toothing.

Preferably, said coupling portion comprises at least one surface portion extending radially and/or at least one surface cylindrical portion extending around a rotation axis of said assembly.

Preferably, in the preferred embodiments of the assembly described herein the crank arm comprises an arm of predetermined length L and a plurality of coupling arms with said first annular element extending substantially radially with respect to a rotation axis of the crank arm and the radial extension of which is defined by a circumference of diameter T", in which L/T" is between 0.7 and 1.

Preferably, the ratio L/T" is between 0.8 and 0.9.

Preferably, in the preferred embodiments of the assembly described herein the crank arm is made from a light metallic material or, more preferably, from a composite material.

In a second aspect thereof, the present invention relates to a right crank arm for a bicycle, comprising an arm of predetermined length L and a plurality of coupling arms with a toothed annular element extending substantially radially with respect to a rotation axis of said crank arm, wherein the radial extension of said coupling arms is defined by an ideal circumference of diameter T", wherein the ratio L/T" is between 0.7 and 1.

Advantageously, such a crank arm can be used in an assembly of the type described above. In particular, since such a crank arm has longer arms than those of crank arms of the prior art, it can be coupled both with an annular element having coupling portions with the crank arm extending cantilevered from the radially inner surface of the annular element and of short radial extension, and with an annular element in which the coupling portions are defined by the same radially inner surface of the annular element.

Preferably, the ratio L/T" is between 0.8 and 0.9.

Preferably, the crank arm described herein comprises first coupling portions with the annular element arranged on the coupling arms at a first annular area having an inner diameter greater than or equal to 150 mm and an outer diameter less than or equal to 180 mm.

More preferably, said first annular area has an inner diameter greater than or equal to 160 mm and an outer diameter less than or equal to 170 mm.

Preferably, the crank arm described herein further comprises second coupling portions with a second annular element arranged on the coupling arms at a second annular area having an inner diameter greater than or equal to 100 mm and an outer diameter less than or equal to 130 mm.

More preferably, said second annular area has an inner diameter greater than or equal to 110 mm and an outer diameter less than or equal to 120 mm.

In the preferred embodiment of the crank arm described herein, said coupling portions comprise threaded holes.

Description

Figure 2:
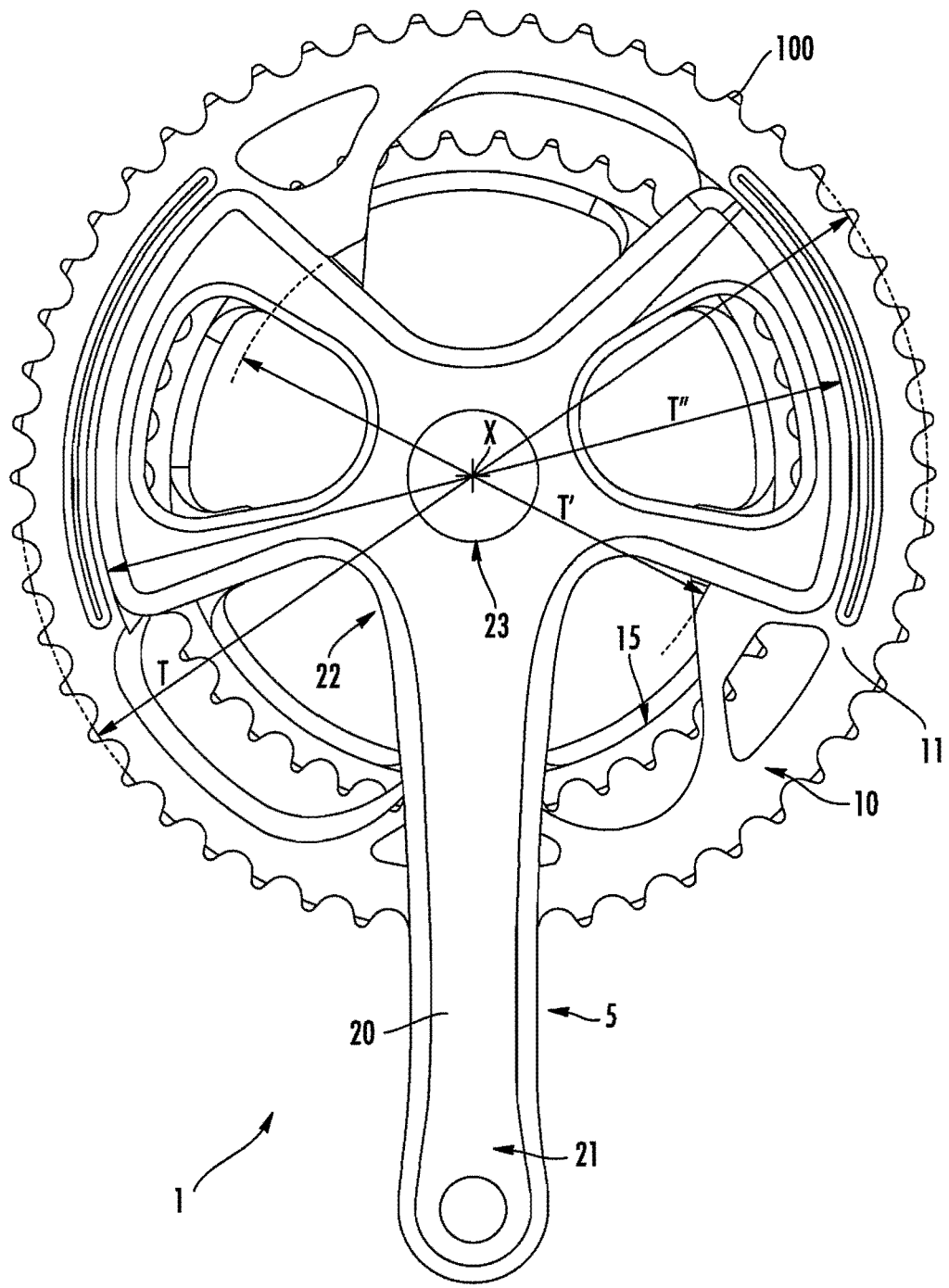
FIG. 2 is a front view of the outer side of the assembly of FIG. 1.

With reference to FIGS. 1 and 2, a first embodiment of a right crank arm assembly according to the present invention is indicated with 1. The assembly 1 comprises a right crank arm 5, a front sprocket of larger diameter 10 (hereafter indicated as big front sprocket) and a front sprocket of smaller diameter 15 (hereafter indicated as small front sprocket). Alternative and not illustrated embodiments are foreseen in which the assembly 1 comprises just one front sprocket, for example for use on a racing track, or more than two front sprockets, for example three.

Figure 3:
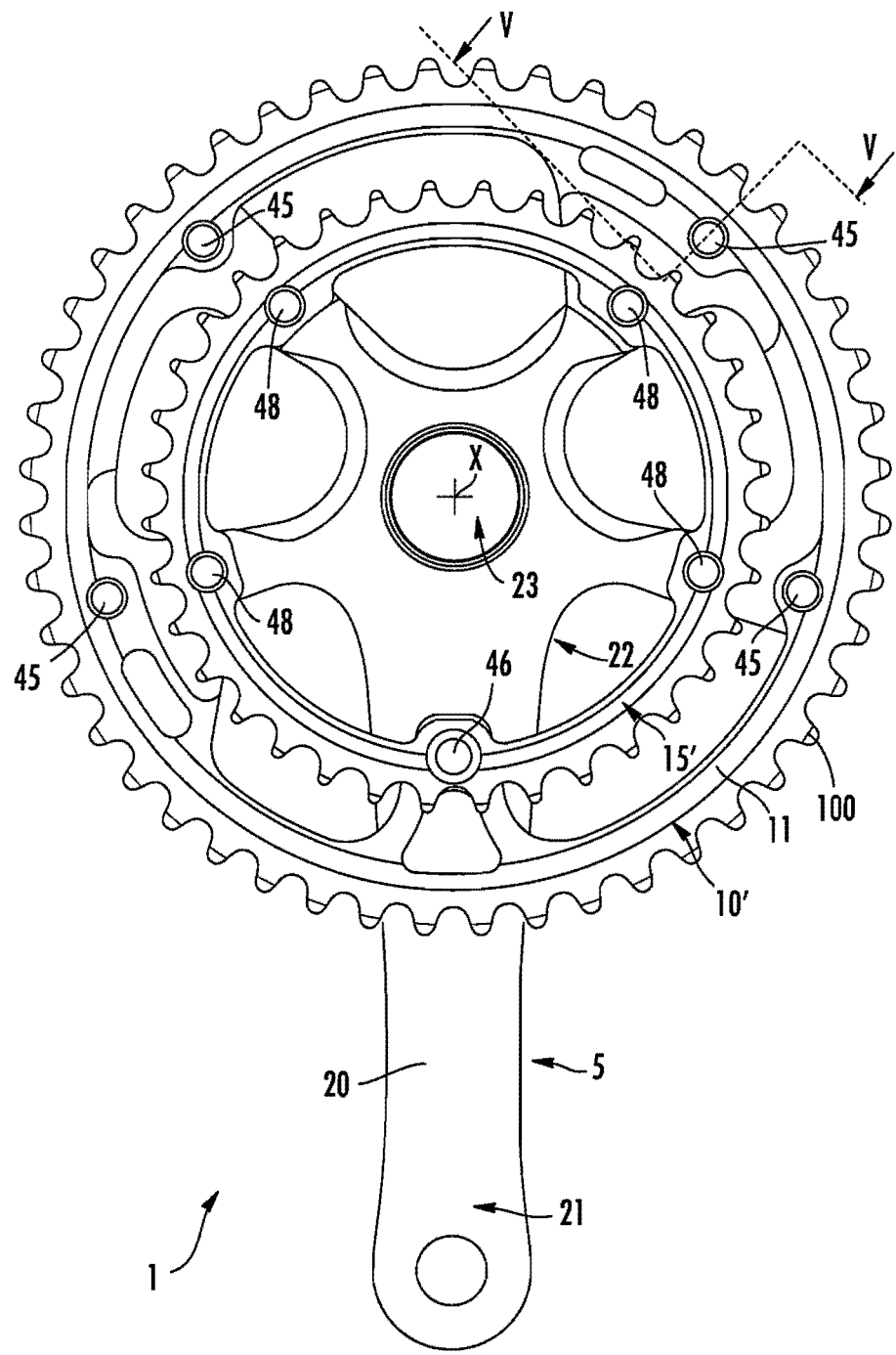
FIG. 3 is a front view of the inner side of a right crank arm assembly according to the present invention, comprising a combination of compact-type front sprockets.

Throughout the present description and in the subsequent claims, the "inner side" of the assembly 1, of the crank arm 5 and/or of the front sprockets 10 and 15 shall indicate the side visible in FIGS. 1 and 3, i.e. the one facing towards the frame of the bicycle when the assembly 1 is mounted in the bottom bracket assembly. On the other hand "outer side" shall indicate the side opposite the inner side, visible in FIGS. 2 and 4.

Throughout the present description and in the subsequent claims, moreover, "previous position" or "following position" shall respectively indicate the position of an element that precedes and that follows a reference element in the direction of rotation of the crank arm, where the rotation is in the direction such as to transmit driving force to the rear wheel.

The right crank arm 5 described herein can be made from metallic material, like a light alloy, such as aluminum or magnesium and their alloys, or from composite material, comprising structural fibers incorporated in a polymeric material. Typically, the structural fibers are selected from the group consisting of carbon fibers, glass fibers, aramid fibers, ceramic fibers, boron fibers and combinations thereof, carbon fibers being preferred. Preferably, the polymeric material of the body of the component is thermosetting. However, the possibility of using a thermoplastic material is not excluded. More preferably, the polymeric material comprises an epoxy resin. While these materials are preferred, they are not limiting to other materials that may be chosen.

The arrangement of said structural fibers in the polymeric material can be a random arrangement of pieces or sheets of structural fibers, a substantially unidirectional ordered arrangement of fibers, a substantially bidirectional ordered arrangement of fibers, or a combination of the above.

In an alternative embodiment, the fibers are organized in a fabric wound with continuity around a recess, as described in patent EP 1270394 and in European patent applications n° 06425086 and 06425087 (U.S. application Ser. Nos. 11/657,279 and 11/501,565) to the same Applicant, the content of which are incorporated herein by reference as if fully set forth.

Figure 6:
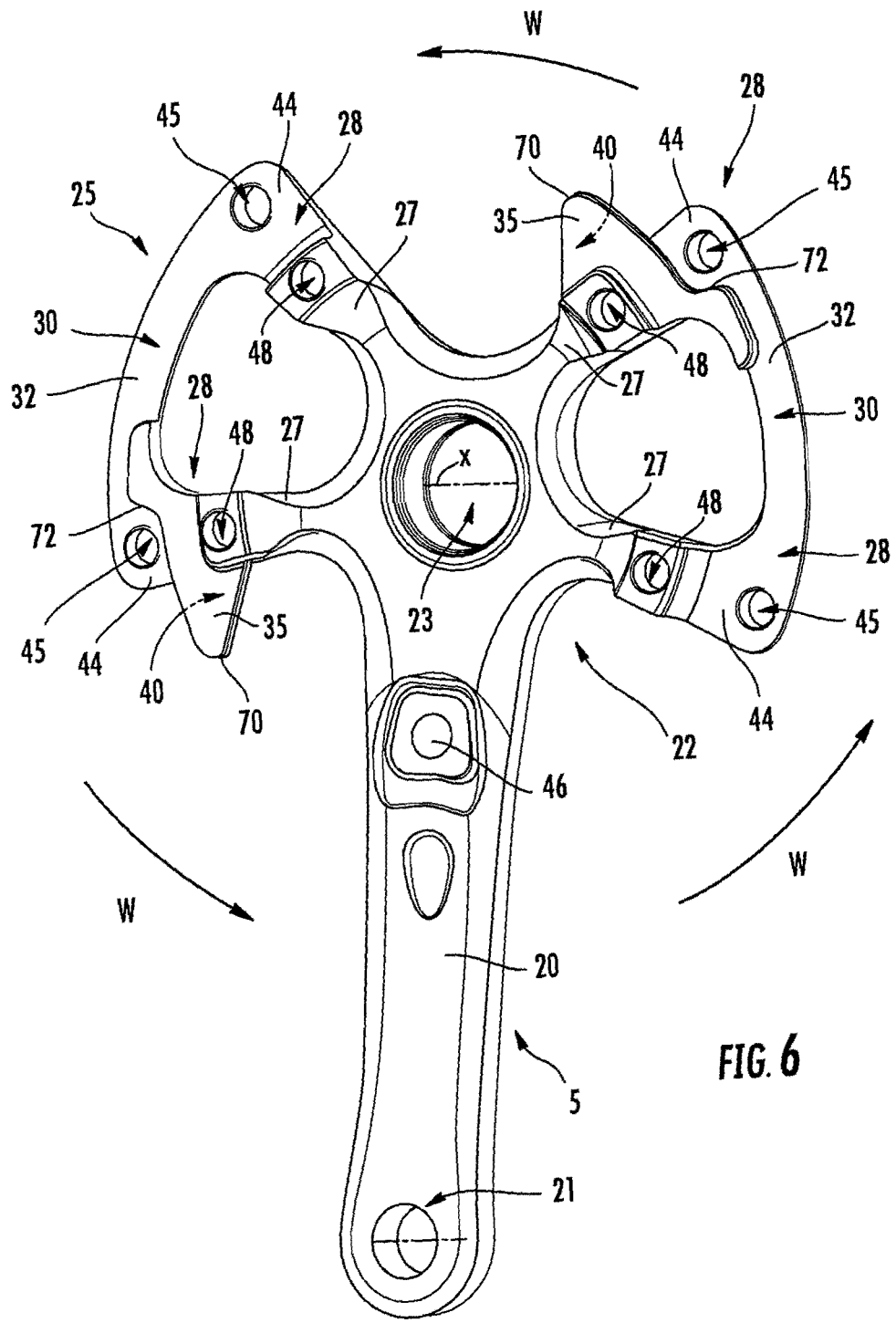
FIGS. 6 to 8 are respectively a perspective view, a view of the inner side and a view of the outer side of a right crank arm according to the present invention, such a crank arm being used in the assembly of FIG. 1.
Figure 7:
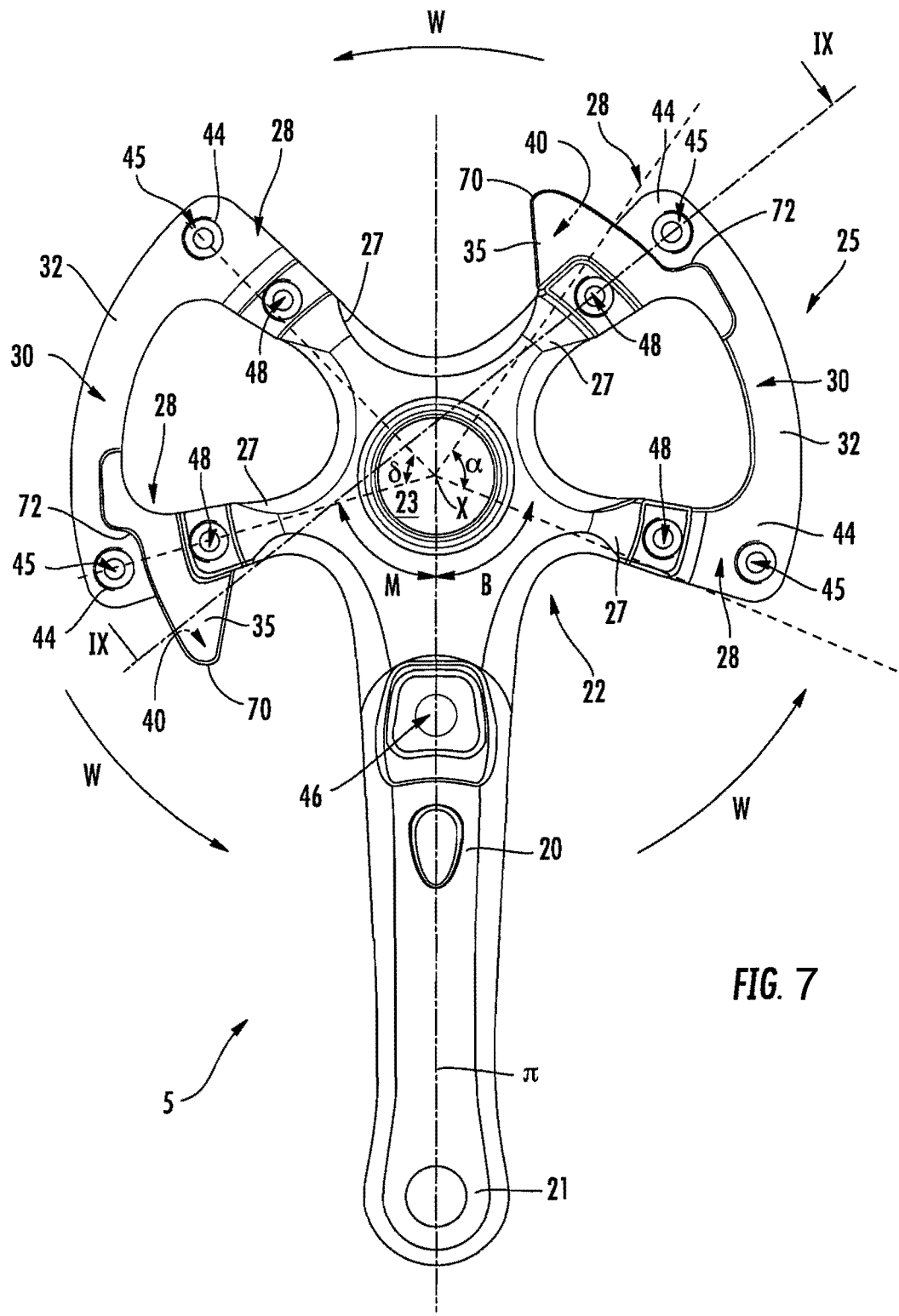
Figure 8:
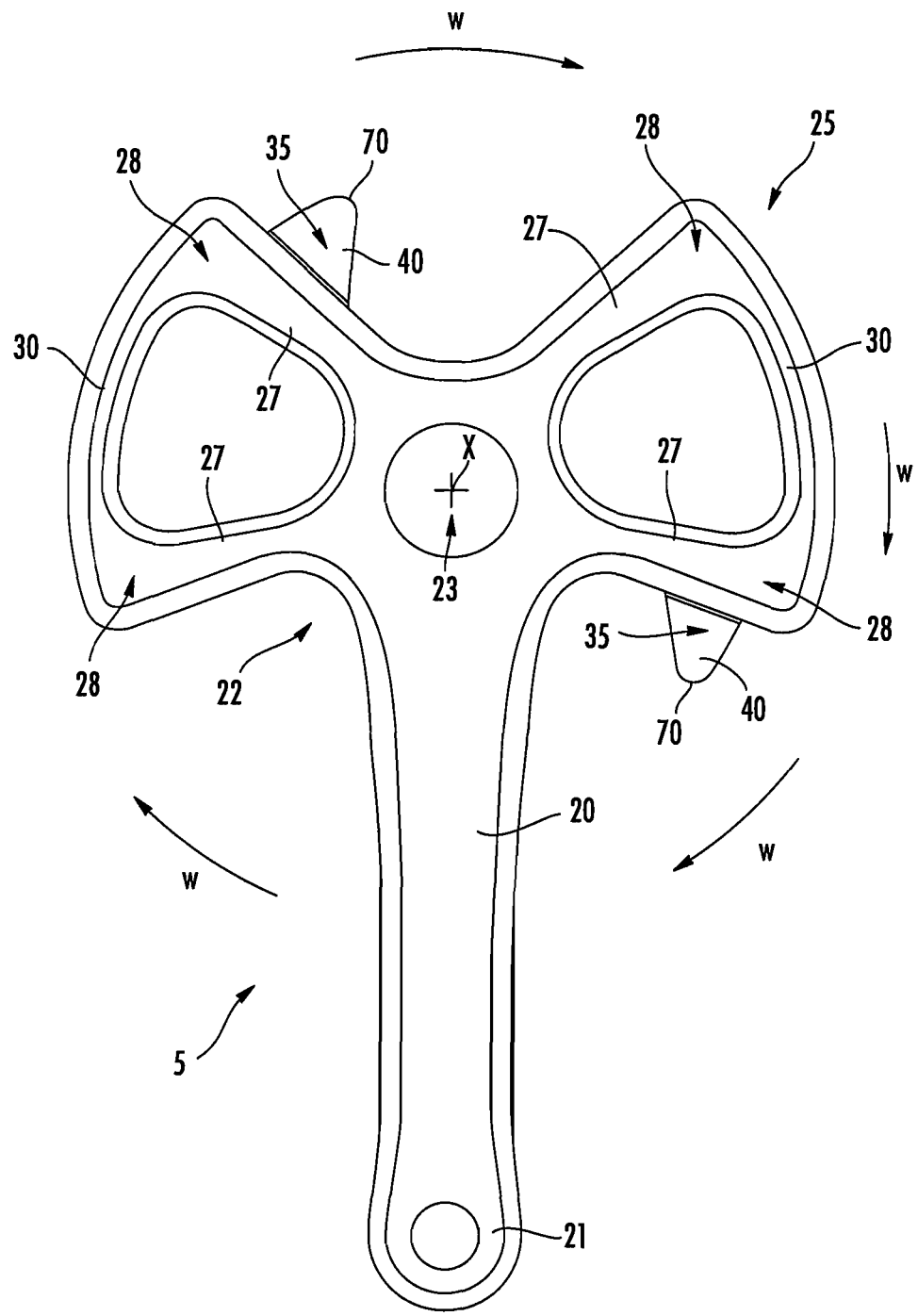

With particular reference to FIGS. 6 to 8, the right crank arm 5 comprises an main body 20 having a first end 21 for coupling with a pedal (not illustrated) and a second end 22 for coupling with the front sprockets 10 and 15 and with a shaft of a bottom bracket assembly (not illustrated). In particular, the second end 22 comprises a hole 23 for housing the shaft of the bottom bracket assembly. In alternative and not illustrated embodiments but known to a person of ordinary skill in the art, the shaft is removably coupled with the right crank arm, or it is an integral part thereof.

A support structure 25 of the front sprockets 10 and 15 is provided about the hole 23, comprising four coupling arms (or spokes) 27 that extend substantially radially around the hole 23 inside of which a rotational axis X of the crank arm 5 is defined.

At the respective free end portions 28 the arms 27 are connected in sets of two by a reinforcing element 30, preferably extending circumferentially around the rotational axis X of the crank arm 5 and made in the form of an arc of circle.

Each reinforcing element 30 that connects a pair of arms 27 comprises a contact surface 32 at the outer side of the big front sprocket 10.

The contact surfaces 32 preferably have an angular extension a (FIG. 7) greater than or equal to 15°, preferably between 15° and 100°, more preferably between 30° and 75° and are arranged at an angular distance 6 from the middle plane H of the elongated body 20, where 6 is preferably between 30° and 90°.

In an alternative embodiment of the crank arm 5 (not illustrated) the pairs of arms 27 connected by the element 30 are replaced by a single arm of equal angular extension.

Now considering the pairs of arms 27 connected together by the element 30, the arm 27 of each of them coming first in the direction of rotation co of the right crank arm 5 around the rotational axis X of the crank arm 5, comprises an element 35 extending cantilevered in the circumferential direction in the direction of rotation co. Each element 35 comprises a contact surface 40 at the inner side of the big front sprocket 10.

Coupling portions 44 with the big front sprocket 10 are defined at the free ends 28 of each arm 27. The element 30 connects the coupling arms 27 right at such coupling portions 44. The coupling portions 44 are provided with coupling holes 45.

The coupling portions 44 with the ends 28 of the arms 27 connected by the element 30 are arranged at an angular distance y from each other of between 45° and 95°, and the coupling portion 44 closest to the elongated body 20 is arranged at an angular distance p of between 35° and 85° from the plane II.

An additional coupling hole 46 with the front sprocket 10 is preferably provided on a portion of the elongated body 20 (FIG. 7).

Figure 9:
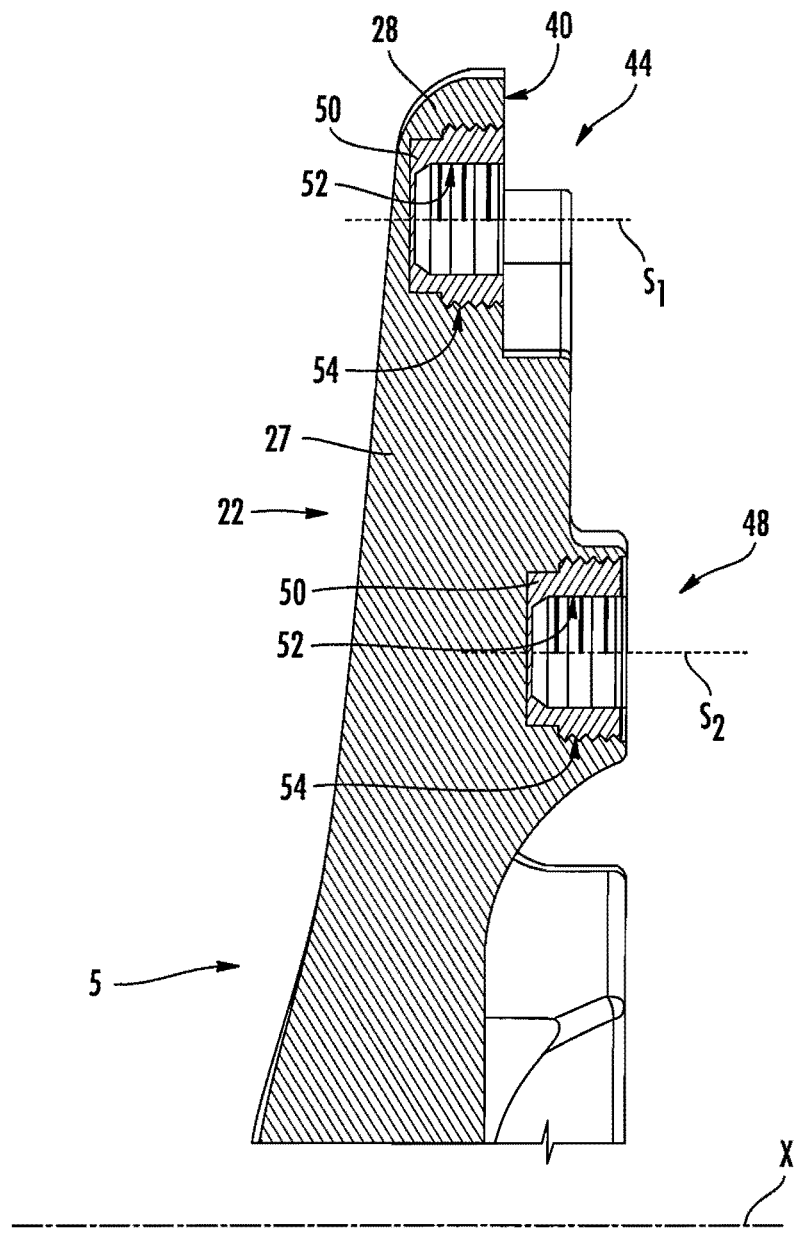
FIG. 9 is an enlarged section view according to the line IX-IX of FIG. 7.

The section of FIG. 9 shows in detail an example embodiment of the coupling portions 44 in the case in which the right crank arm 5 is made from composite material. The coupling portions 44 are in this case preferably defined by metallic inserts 50 provided with a threaded hole 52 for the insertion of a screw (not illustrated). The outer surface 54 of the inserts 50 is irregular, and preferably threaded, so as to be able to be better held in the composite material, to which it is fixed by gluing or by direct adhesion due to a co-moulding process.

An alternative embodiment of the assembly described herein is foreseen in which the threaded hole 52 is directly made in the composite material.

As shown in detail in FIG. 1, the crank arm 5 described herein further comprises, in a preferred embodiment thereof, second coupling portions 47 used for the coupling of the small front sprocket 15. The coupling portions 47 are preferably made identical to the coupling portions 44 and comprise coupling holes 48.

The coupling portions 44 and 47 are at different distances from the rotational axis X of the right crank arm 5. In particular, their axes of symmetry S1 and S2 lie on two ideal circumferences of different diameter.

As illustrated in FIGS. 1, 3, 6, 7 and 12, the coupling portions 44 and 47 are preferably non-radially aligned with each other. Indeed, the coupling portions 44 are at smaller angular distances y apart than the angular distances between the coupling portions 47.

Both the big front sprocket 10 and the small front sprocket 15 are coupled with the main body 20 of the crank arm 5 at the additional coupling portion 46.

Figure 5:
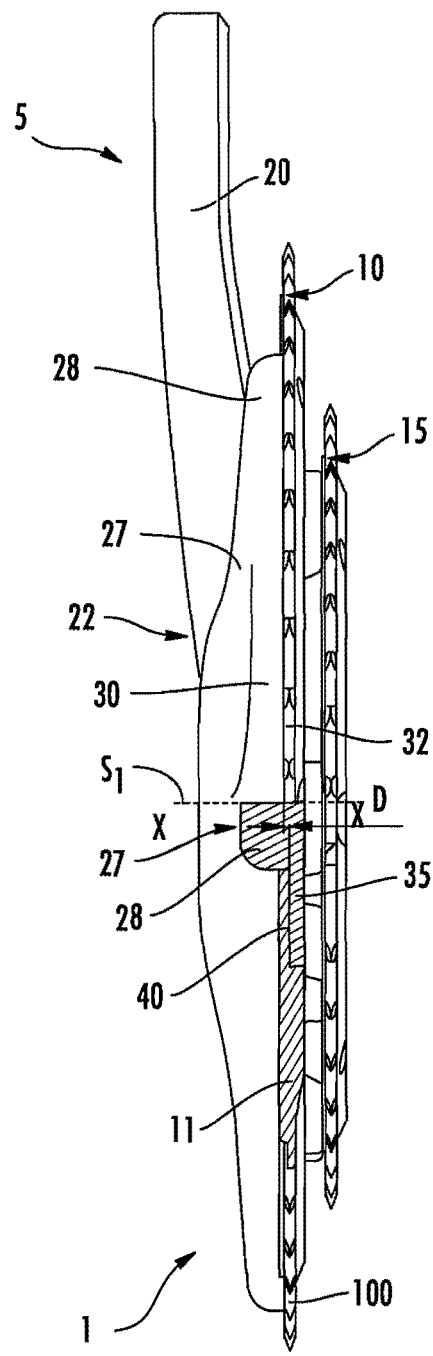
FIG. 5 is a section view according to the section line V-V of FIG. 3.

With particular reference now to the section illustrated in FIG. 5, in a preferred embodiment described herein the contact elements 30 and 35 respectively at the outer side and at the inner side of the big front sprocket 10 are located substantially at the opposite side with respect to the coupling portions 44, identified by the axis of symmetry S1 (said axis is parallel to the rotational axis x of the crank arm 5). In particular, the surface 32 of the element 30 for contact at the outer side of the front sprocket 10 follows the coupling portion 44 in the direction of rotation co, whereas the surface 40 of the element 35 for contact at the inner side of the front sprocket 10 precedes the coupling portion 44 (FIGS. 6 and 7). The elements 30 and 35 are therefore active in abutment on the front sprocket at different angular positions. It should be appreciated from FIG. 5 that the first contact element 30 and the second contact 40 element are offset from one another along the rotational axis of the right crank arm 5; this offset creates a gap in which the front sprocket 10 is engaged.

Figure 13:
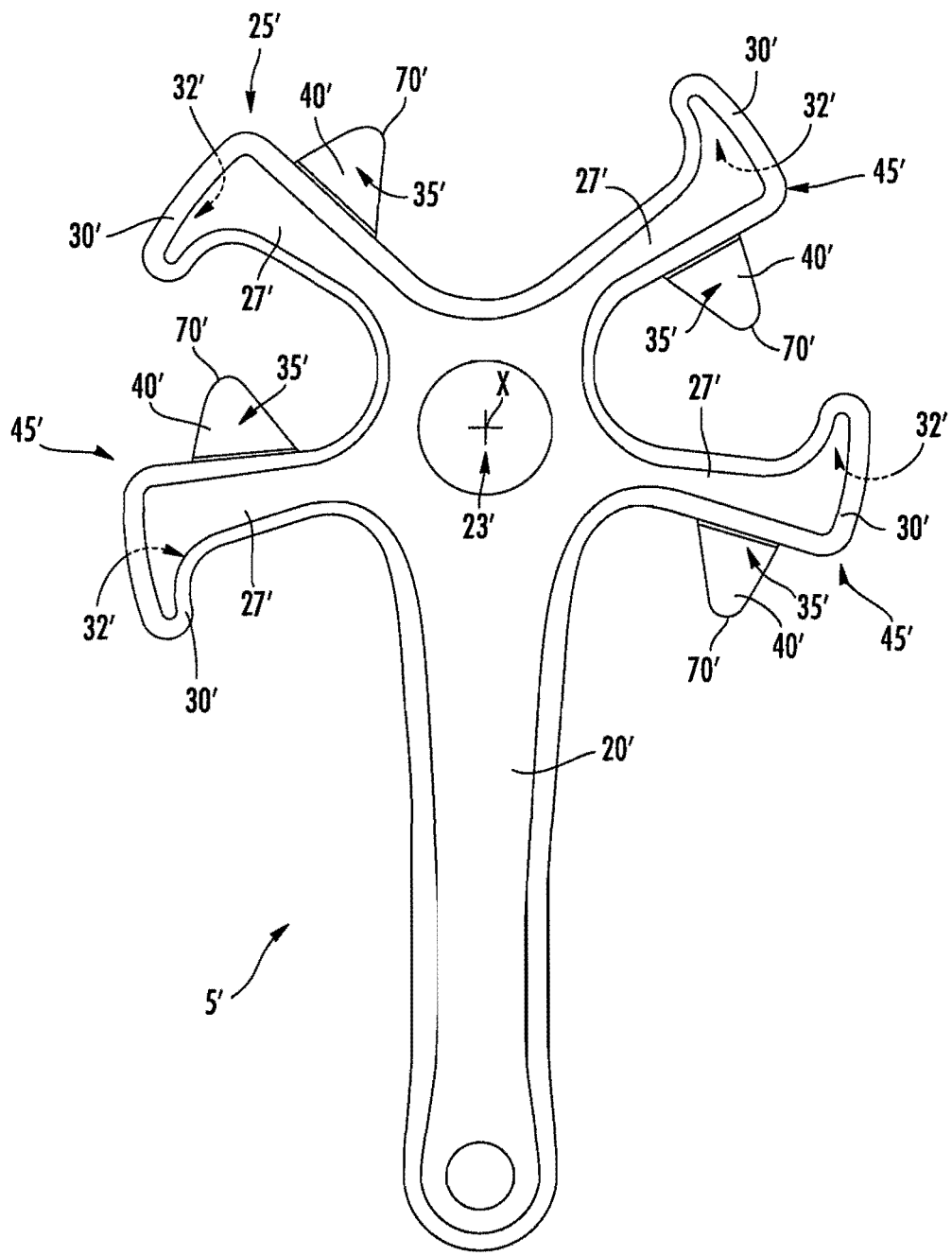
FIG. 13 is a front view of the outer side of an alternative embodiment of the crank arm described herein.

In an alternative embodiment of the crank arm illustrated in FIG. 13 and indicated with 5', the arms 27' instead of being connected in sets of two through the elements 30, each comprise an element 30' extending cantilevered circumferentially around the rotational axis X of the crank arm 5'. Each element 30' comprises a respective contact surface 32' at the outer side of the big front sprocket 10. Each of the arms 27' also comprises a respective contact surface 40' at the inner side of the big front sprocket 10. The contact surfaces 32' and 40' are arranged in a position respectively prior to and after the coupling portion 44 (hidden in the figures) provided on the arm 27. In this case, the number of arms 27 can also be odd, for example three or five.

In a further not illustrated embodiment of the assembly described herein, just one or in any case just a few of the arms 27 comprise a contact surface 40 at the inner side of the big front sprocket 10, between which the arm 27 immediately following the elongated body 20 with reference to the direction of rotation co of the crank arm 5 and preferably the arm 27 arranged in a substantially symmetrical position with respect to the main body 20 of the crank arm 5.

In accordance with the invention, the contact surfaces 32 and 40 do not lie on the same plane, but a predetermined axial distance D apart (FIG. 5). In this way the big front sprocket 10 does not need to be deformed to be inserted between the two contact surfaces. It is thus sufficient for the front sprocket 10 to have a thickness equal to D in the contact area with the crank arm 5. Preferably D is equal to or less than the maximum thickness of the big front sprocket 10.

In the embodiments illustrated in the attached figures, the elements 30 and 35 are integral with the main body 20 of the crank arm 5, but in other not illustrated embodiments such elements can be made in separate pieces and coupled with the crank arm 5.

Figure 10:
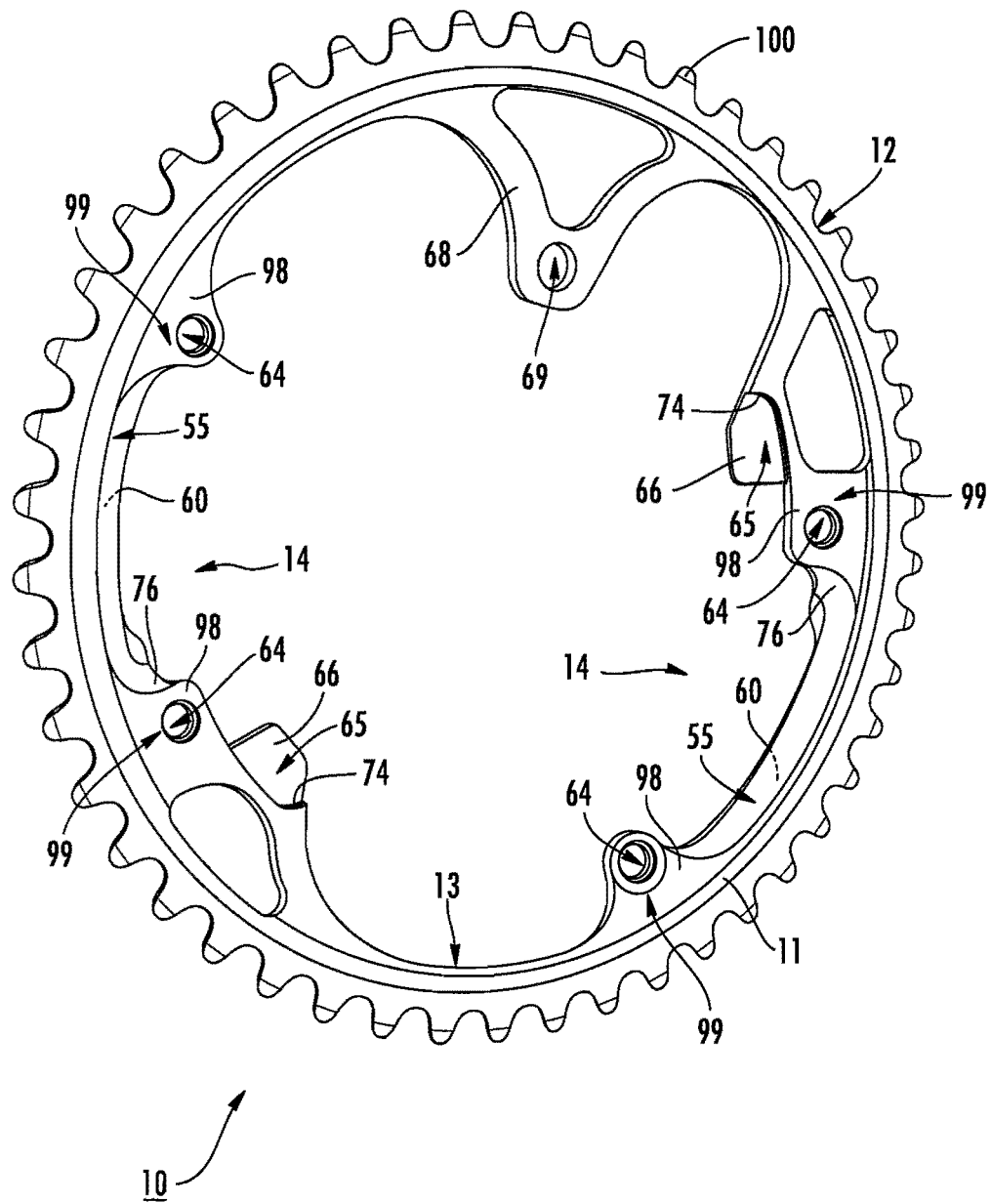
FIGS. 10 and 11 are respectively perspective views of the inner side and of the outer side of a front sprocket according to the present invention, such a front sprocket being used in the assembly of FIG. 1.
Figure 11:
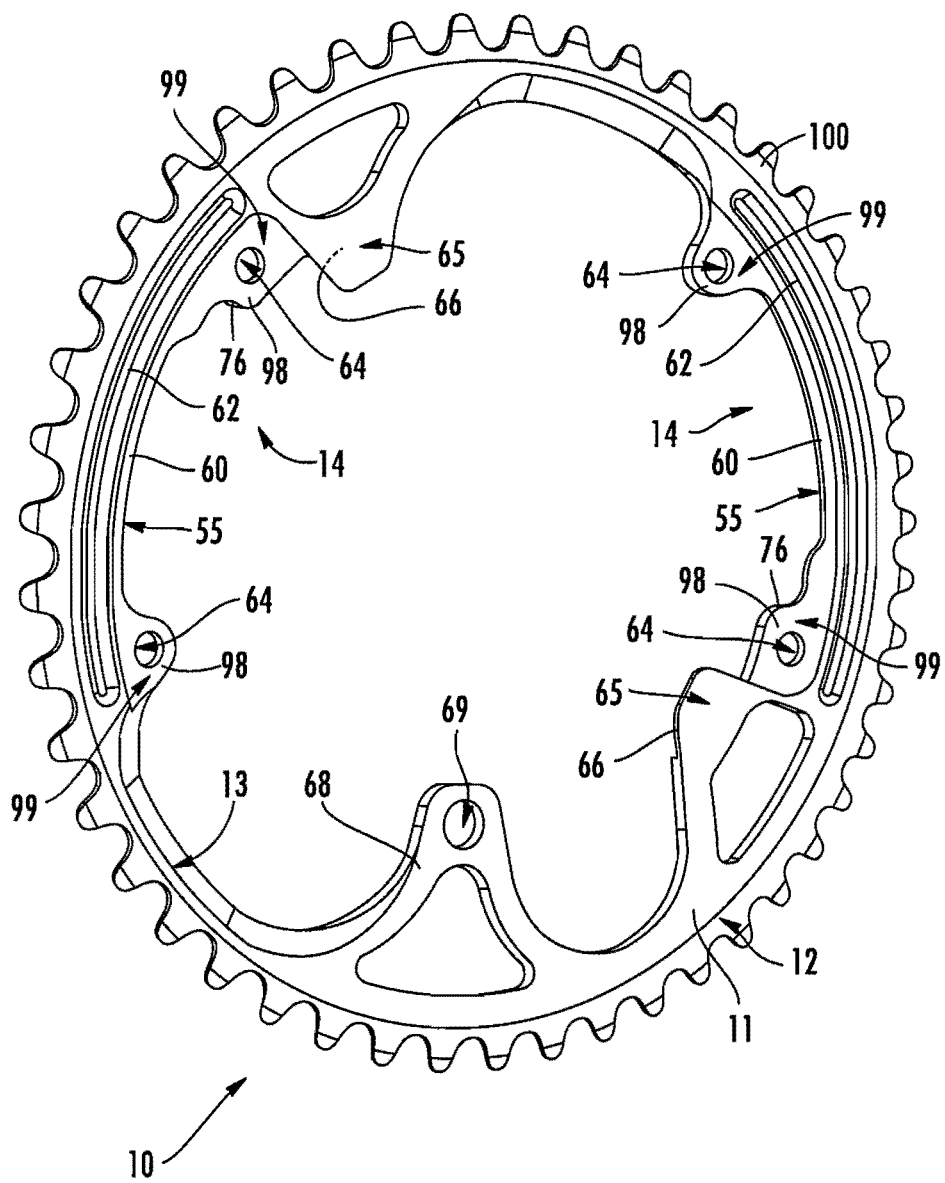

In FIGS. 10 and 11, the big front sprocket 10 of the right crank arm assembly 1 shown in FIGS. 1 and 2 is illustrated.

Such a front sprocket comprises an annular element 11, preferably made from light metal alloy or from composite material, having a radially outer annular surface 12 on which a toothed portion 100 (hereafter also indicated as toothing) is formed extending radially towards the outside and a radially inner annular surface 13 from which four elements 98 for coupling with the crank arm extend radially cantilevered. In particular, the elements 98 are adapted to be coupled with the arms 27 of the crank arm 5 by coupling respective coupling portions defined on the elements 98 with the coupling portions 44 defined on the arms 27. The coupling takes place through screws (not illustrated) inserted in holes 64 formed on each coupling element 98.

On outer side thereof (FIG. 11) the big front sprocket 10 comprises two elements 55 having respective contact surfaces 60 adapted to contact the contact surfaces 32 of the elements 30 of the right crank arm 5. The elements 55 have the same angular extension as the elements 30 and each element 55 extends without structural interruption between two adjacent elements 98. What has been stated above with reference to the number, angular position with respect to the coupling portions 44 and angular extension of the elements 30 of the crank arm 5 with respect to the rotational axis of the crank arm is therefore also valid for the elements 55 of the front sprocket 10 with reference to the coupling portions defined on the elements 98 and with reference to the rotational axis of the front sprocket.

The elements 55 are preferably surmounted in the radial direction by a throat 62 extending according to an arc of circle.

At the ends of the elements 55 the holes 64 for the passage of the screws that insert into the inserts 50 of the right crank arm 5 are formed.

On the inner side of the front sprocket 10 (illustrated in FIG. 10), on the other hand, a pair of elements 65 are provided having respective contact surfaces 66 adapted to contact the contact surfaces 40 of the elements 35 of the right crank arm 5.

The big front sprocket 10 further comprises an additional arm 68 with a hole 69 for the passage of a screw intended to insert into the hole formed in the additional coupling portion 46 of the crank arm 5, in the case in which such an additional coupling portion is present.

In the embodiment of the big front sprocket 10 illustrated in detail in FIGS. 10 and 11, each contact element 55 and 65 with the crank arm 5 is defined at a single body portion 14 of the annular element 11 that extends radially cantilevered towards the centre of the front sprocket 10 from inner surface 13 thereof and that also comprises a pair of coupling elements 98. The elements 55, 65, and 98 are therefore all an integral part of the body portion 14.

Figure 14:
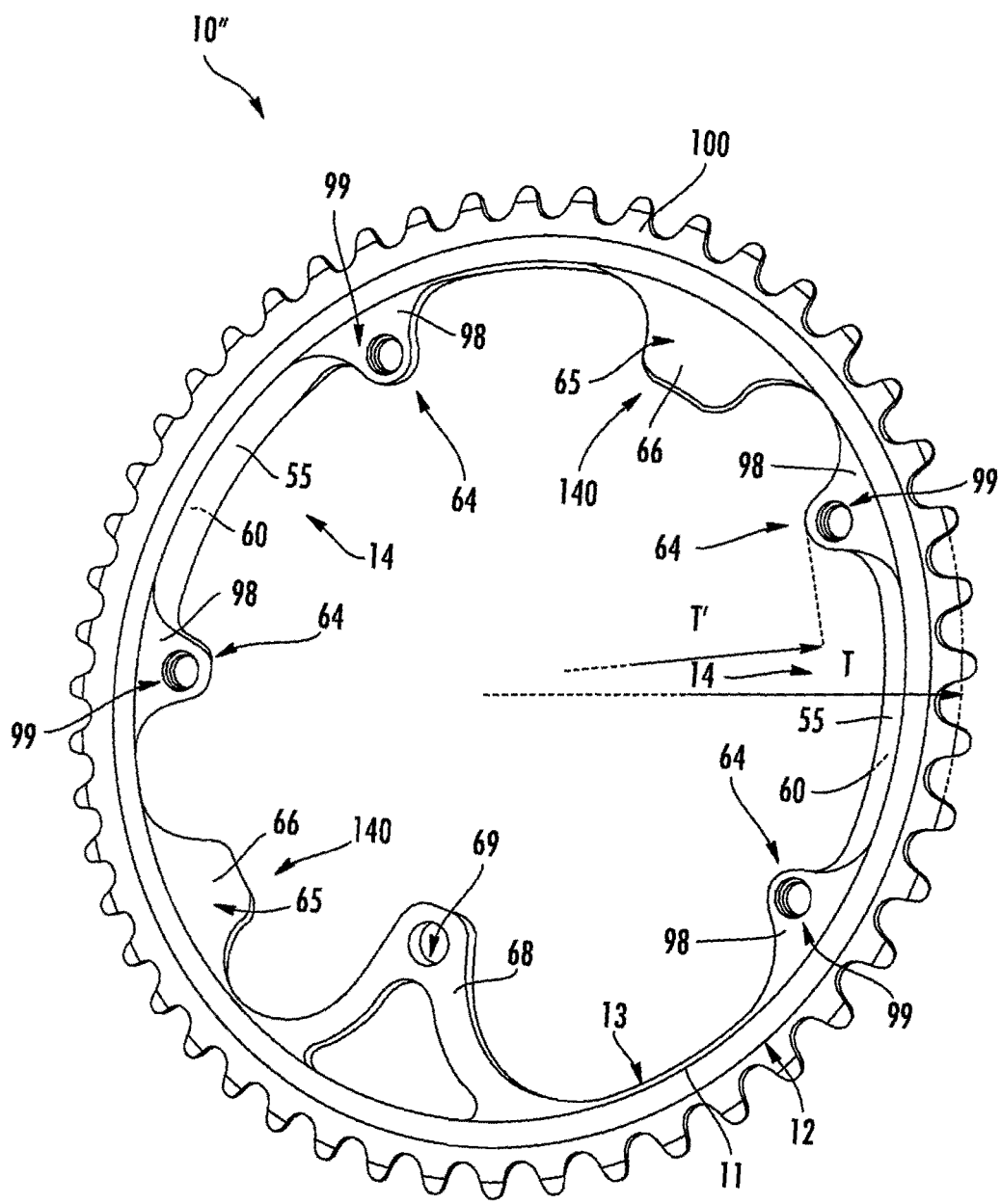
FIG. 14 is a perspective view of the inner side of an alternative embodiment of the front sprocket described herein.

FIG. 14 shows an alternative embodiment of the big front sprocket, indicated with 10. In such an embodiment no single body portion 14 that comprises the elements 65 and 98 can be identified. Indeed, the body portion 14 here comprises just the contact element 55 and a pair of elements 98 for coupling with the crank arm 5, whereas the contact elements 65 with the crank arm are defined at further and respective body portions 140, distinct and separate from the body portion 14 of the annular element 11, which also extend radially cantilevered from the inner surface 14 of the annular element 11 towards the centre of the front sprocket 10 and which do not comprise the coupling elements 98 and the contact elements 55 with the crank arm 5.

In such an embodiment, the elements 98 and 65 are made adjacent to the toothed portion 100 of the front sprocket 10. Preferably, considering the diameter T of the primitive circumference of the toothed portion 100, the elements 98 and 65 are located and entirely contained in an annular area extending radially between the inner surface of said annular element and an ideal circumference of diameter T' such that T>T'≤aT, where a is selected from ⅔, ¾, ⅘, ⅚ or 6/7.

Preferably, the aforementioned inner surface is defined at an ideal circumference arranged at least 1 mm radially towards the inside from the toothed portion 100.

The front sprocket 10 in this case therefore reduces to a toothed band provided with radial projections constituting the coupling elements 98 and the contact elements 55 and 65 and having a short radial extension. Consequently, the maximum radial extension of the coupling arms provided in the crank arm is defined by a circumference of diameter T" (see FIGS. 2 and 4) such that T>T">T', where the difference between T and T" is simply given by the need to leave a free front sprocket portion which is sufficient to allow the engagement of the teeth with a chain.

Figure 4:
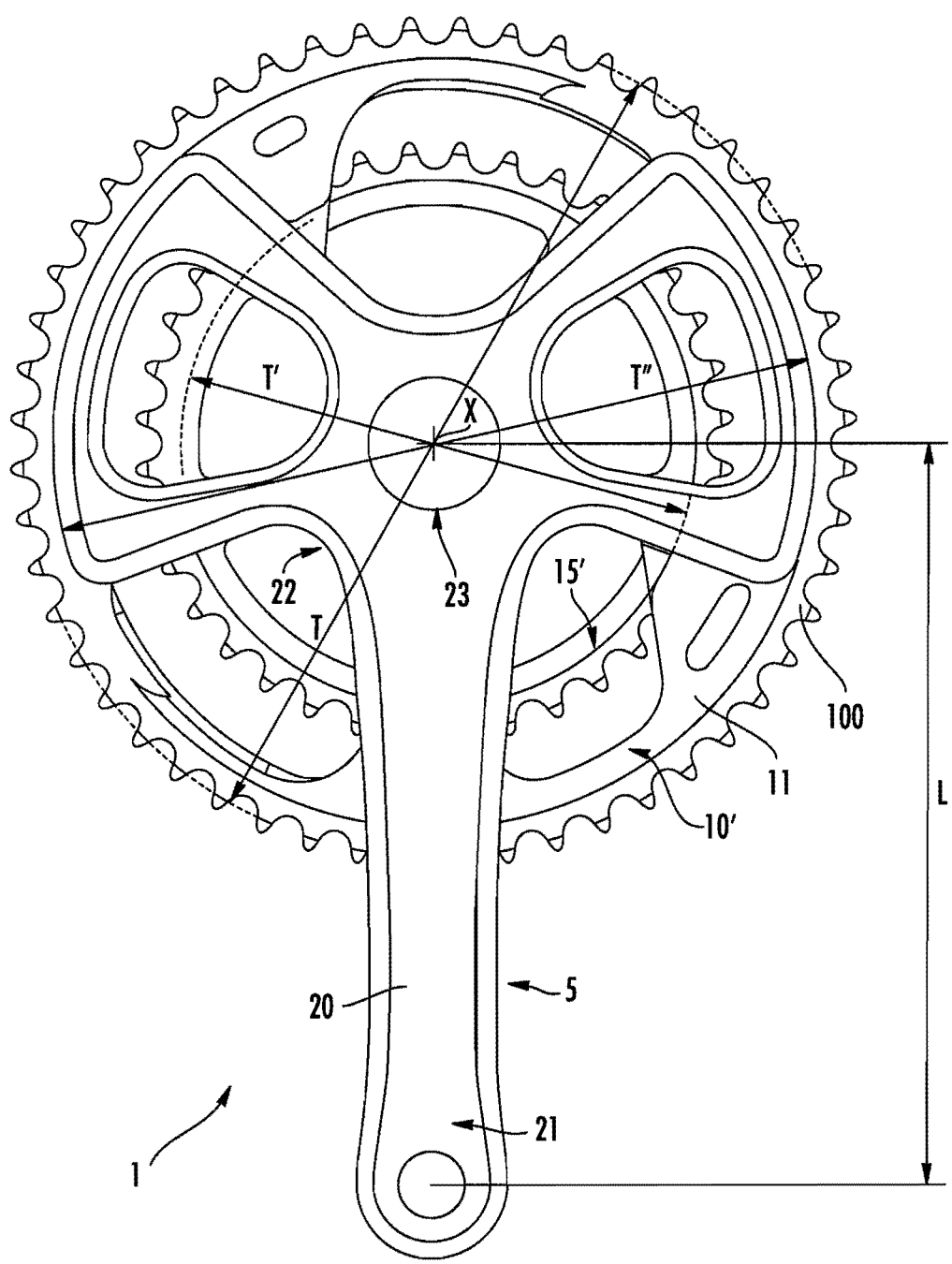
FIG. 4 is a front view of the outer side of the assembly of FIG. 3.

With particular reference to FIG. 4, if L indicates the length of the arm of the crank arm (such a length being commercially set at 170 mm, 172.5 mm and 175 mm), the crank arm of the assembly described herein is sized so that the ratio L/T" is between 0.7 and 1, preferably between 0.8 and 0.9.

A not illustrated embodiment is foreseen in which the front sprocket has coupling elements 98 and contact elements 55 and 65 of short extension as described above with reference to FIG. 14 and all forming part of a single body portion 14 as described above with reference to FIG. 11.

It should be noted how, in all of the embodiments of the front sprocket 10 of the assembly described herein, the contact portions of the front sprocket 10 with the crank arm 5 are structurally and physically distinct from the respective coupling portions.

In the case of use of the front sprocket of FIG. 11 or of the not illustrated embodiment in which the front sprocket has coupling elements 98 and contact elements 55 and 65 of short extension as described above with reference to FIG. 14 and all forming part of a single body portion 14 as described above with reference to FIG. 11, the crank arm of the assembly described herein has coupling arms having a greater radial extension than those of conventional crank arms. In particular, while in conventional crank arms the diameter of the ideal circumference defined by the coupling holes at the big front sprocket and at the small front sprocket is 130 mm or 135 mm in the case of standard combinations and 110 mm in the case of compact combinations, in the crank arm of the assembly described herein the diameter of the ideal circumference defined by the holes 45 for coupling with the big front sprocket 10 is within an annular area having an inner diameter greater than or equal to 150 mm and an outer diameter less than or equal to 180 mm, preferably an inner diameter greater than or equal to 160 mm and an outer diameter less than or equal to 170 mm, whereas that of the ideal circumference defined by the holes 48 for coupling with the small front sprocket 15 is within an annular area having an inner diameter greater than or equal to 100 mm and an outer diameter less than or equal to 130 mm, preferably an inner diameter greater than or equal to 110 mm and an outer diameter less than or equal to 120 mm.

FIGS. 1 and 2 show a right crank arm assembly comprising a combination of standard front sprockets, i.e. a small front sprocket with a minimum of 39 teeth coupled with a big front sprocket with a number of teeth of between 52 and 56 (53 in the front sprocket 10 illustrated).

However, the right crank arm 5 illustrated in FIGS. 6, 7 and 8 can support a wide range of combinations of front sprockets, for example a compact combination, as illustrated in FIGS. 3 and 4, in which the small front sprocket 15' has a minimum number of teeth equal to 34 and the big front sprocket 10' has a number of teeth of between 46 and 50 (48 in the combination illustrated).

It should however be noted that the right crank arm 5 allows any size of front sprockets to be mounted, for which reason it is also possible to adopt combinations of front sprockets different to the standard and compact ones, in particular mixed combinations.

As illustrated in FIGS. 6, 7, 8, 13, the crank arm 5, 5' further comprises abutment surfaces 70, 70' adapted to allow the correct angular positioning of the crank arm with respect to the front sprocket 10. Such surfaces 70, 70' are defined at a free end of the contact element 35, 35' with the crank arm 5, 5'. Further abutment surfaces 72 are provided at a body portion of the element 35 that extends on the opposite side, with respect to the coupling arm 27, to the one at which the abutment surface 70 is defined. The abutment surfaces 70 and 72 cooperate in abutment with corresponding abutment surfaces 74, 76 defined in the big front sprocket 10.

Figure 12:
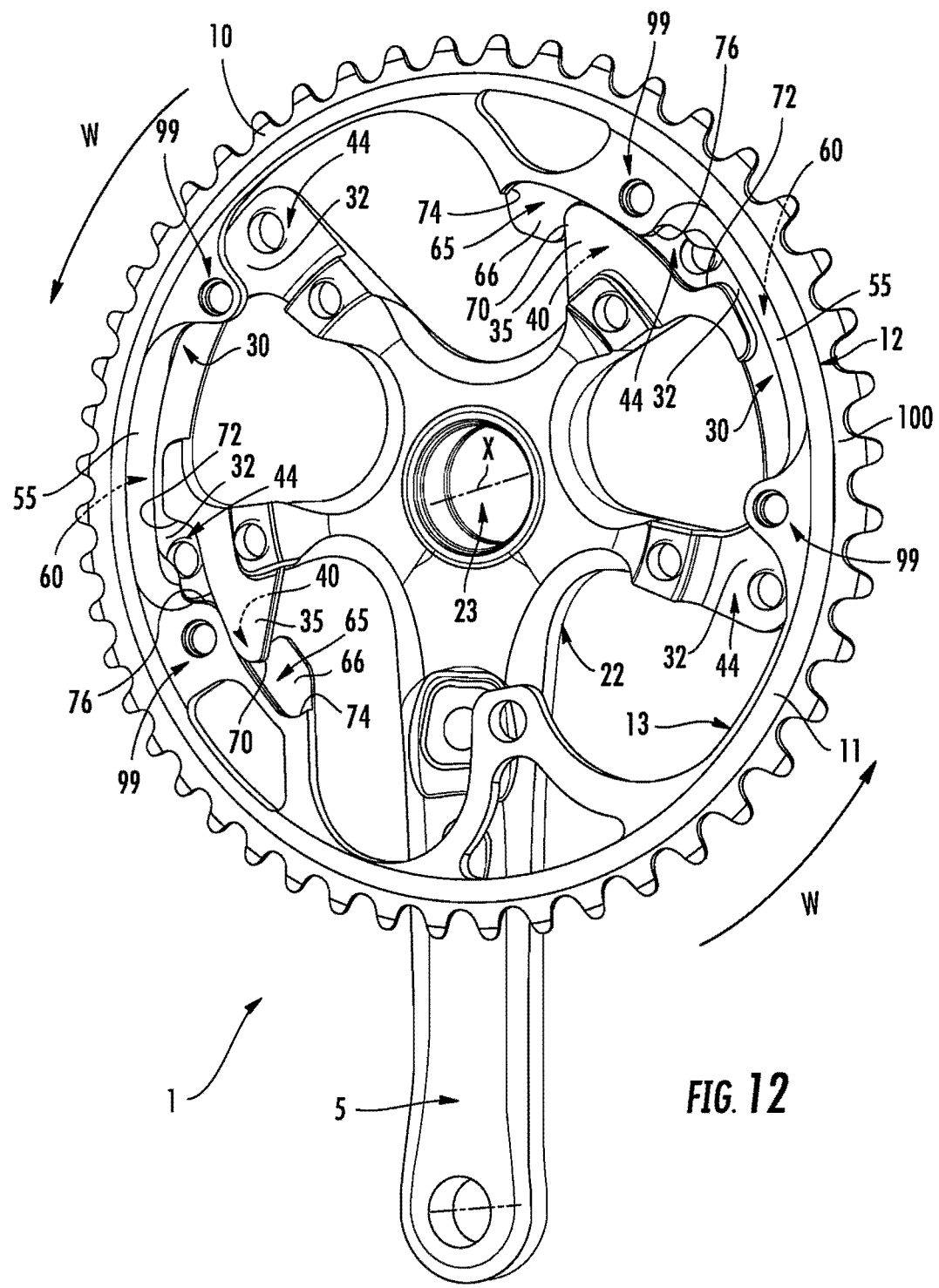
FIG. 12 shows a mounting step of the front sprocket of FIGS. 10 and 11 onto the crank arm of FIGS. 6 to 8.

FIG. 12 illustrates the way to mount a big front sprocket 10 on a right crank arm 5. In particular, the big front sprocket 10 is brought in contact with the right crank arm 5 so that the contact surfaces 32 of the elements 30 of the crank arm 5 come into contact with the contact surfaces 60 of the elements 55 of the front sprocket 10. At this point the right crank arm 5 is rotated with respect to the front sprocket 10 in the same direction of rotation ω in which it rotates during pedaling. The crank arm 5 shall move with respect to the front sprocket until the abutment surfaces 70 and 72 of the right crank arm 5 make contact with the corresponding abutment surfaces 74 and 76 of the front sprocket 10. At this point, the contact surfaces 40 of the elements 35 of the crank arm 5 shall be in abutment with the contact surfaces 66 of the elements 65 of the front sprocket 10. As a result of this, when the surfaces 74 and 76 of the front sprocket 10 are in abutment with the surfaces 70 and 72 of the crank arm, the contact surfaces 32, 40, 60 and 66 cooperate with each other to keep it in position and the operator has both hands free to fix the screws.

It should be appreciated that the first contact element 55 and the second contact element 65 are offset from one another along a rotational axis of the annular element 11.

Figure 15:
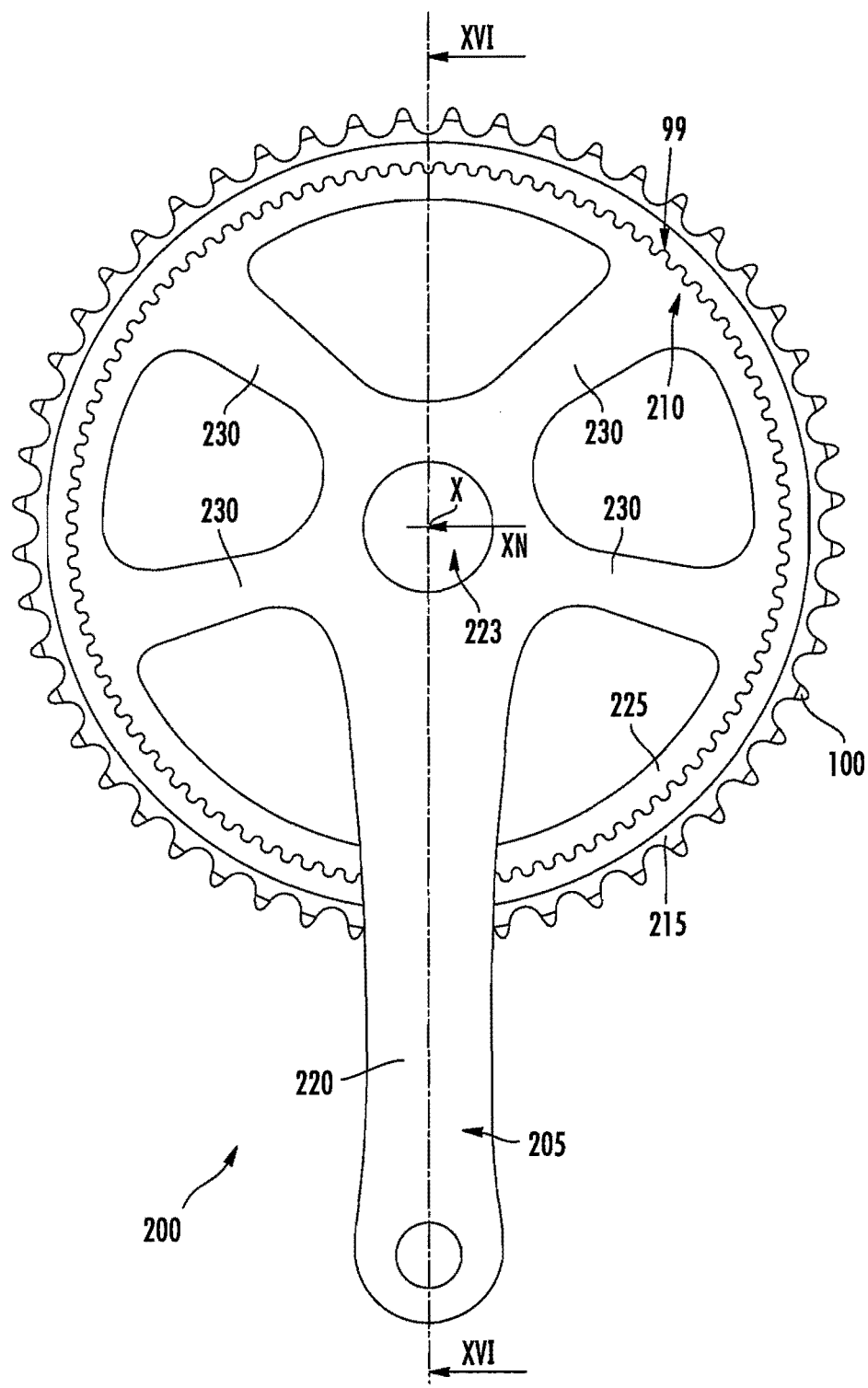
FIGS. 15 and 16 are respectively a front view of the outer side and a perspective view sectioned according to the line XVI-XVI of FIG. 15, of an alternative embodiment of a right crank arm assembly according to the present invention.
Figure 16:
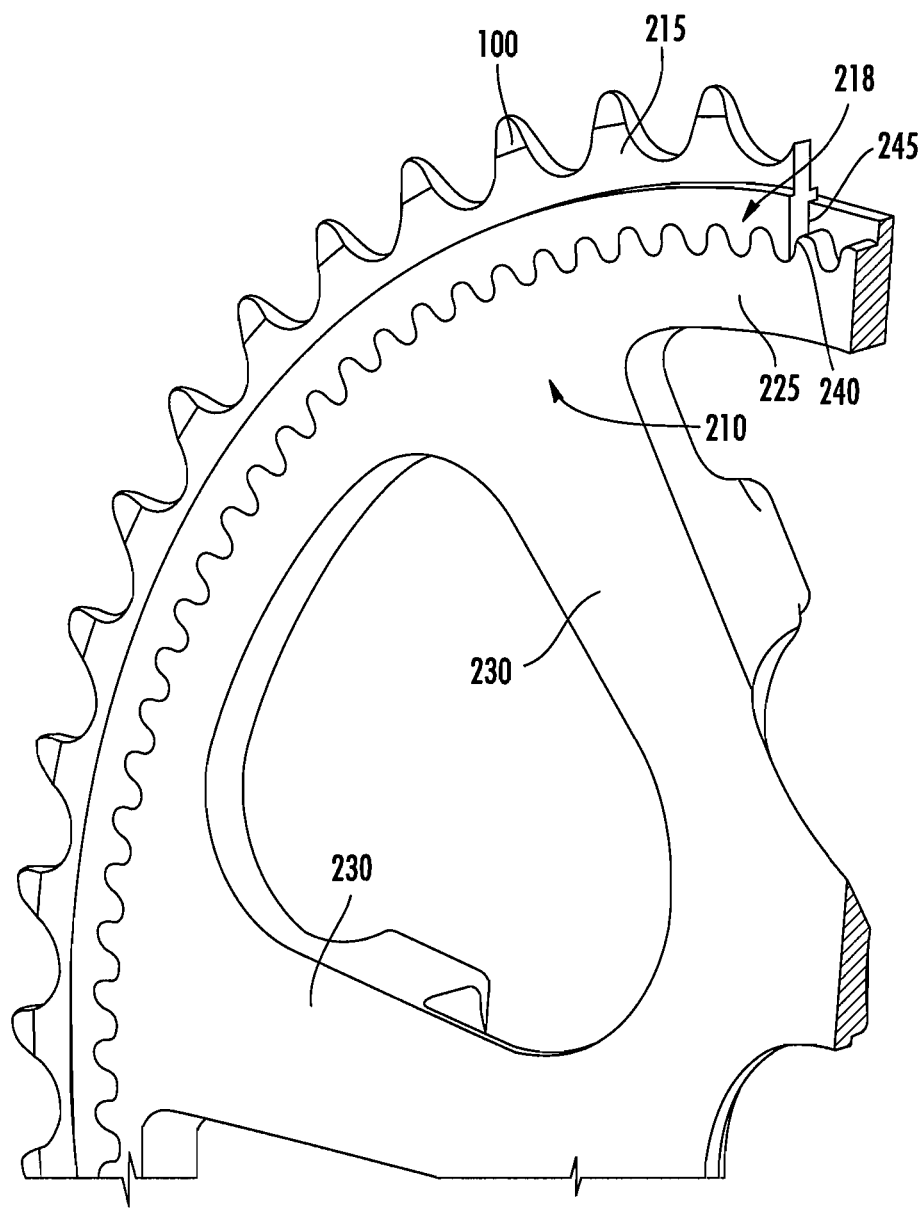

Now with reference to FIGS. 15 and 16, a further embodiment of the right crank arm assembly according to the present invention is illustrated, indicated with 200.

The right crank arm assembly 200 comprises a right crank arm 205, preferably made from composite material, comprising a coupling portion 210 with an annular toothed band 215. The coupling portion 210 preferably comprises an annularshaped outer peripheral portion 225 coupled with the elongated body 220 of the crank arm 205 through a plurality of coupling arms 230.

The coupling between the coupling portion 210 and the toothed band 215 can be of any type capable of transmitting torque. In FIG. 16, as an example, a shape-coupling is illustrated, in particular toothed, preferably strengthened by gluing, or by the adhesion between composite material of the coupling portion 210 and the metal of the toothed band 215 obtained by co-molding. Alternatively, the toothed band 215 and the coupling portion 210 could be made with a threading at their interface to be screwed (and then possibly glued) one to the other. According to a further alternative, the toothed band 215 is fixed onto the coupling portion 210 through screws or other fastening elements.

It should be observed that, although FIG. 16 shows a radial coupling interface 240 and a circumferential coupling interface 245, it does not exclude embodiments in which the coupling is just circumferential or just radial (in which case there are no front or rear contact surfaces as for the embodiments of FIGS. 1 to 14). The coupling between the toothed band 205 and the coupling portion 210 could also be a dovetail coupling, or a coupling extending along a surface inclined with respect to the rotational axis of the annular toothed band 215.

It should also be observed that, although in FIG. 15 just one annular toothed band 215 is shown, an embodiment is foreseen in which the right crank arm 205 is also coupled with a front sprocket or annular band of smaller diameter. The coupling between such an annular band of smaller diameter and the right crank arm 205 is of the same type as that described with reference to the annular toothed band 215.

As highlighted in the variant 200' of FIG. 17, the coupling portion 210', instead of being extended according to a complete ring, can comprise ring portions 225', for example having the dimensions illustrated with reference to the support structure 25 of the crank arm 5 of FIGS. 6, 7 and 8. The coupling between the coupling portion 210' and the annular toothed band 215' is of the same type described for the assembly 200 of FIGS. 15 and 16.

Figure 17:
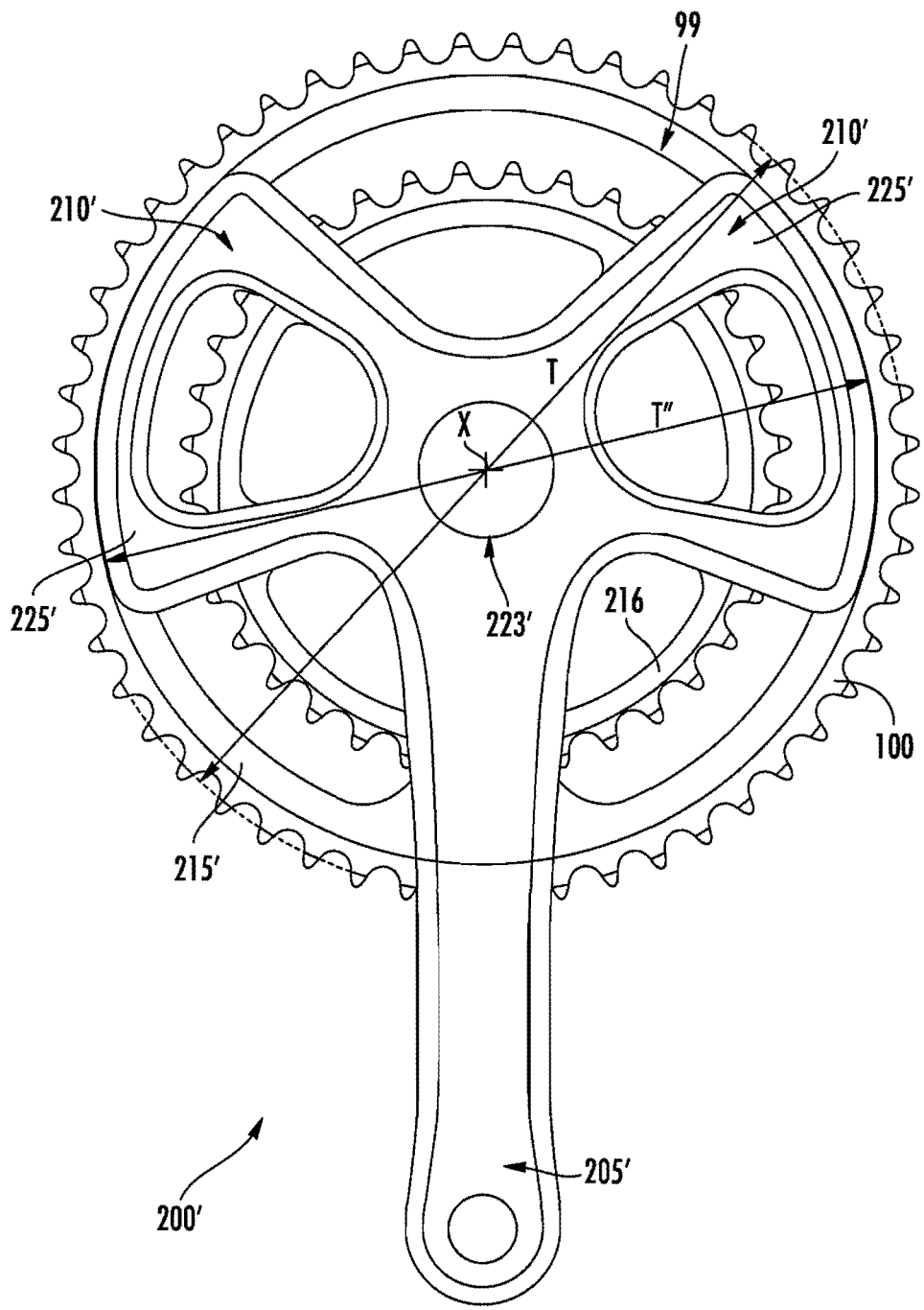
FIG. 17 is a front view of the outer side of a further embodiment of a right crank arm assembly according to the present invention.

FIG. 17 also shows that the right crank arm assembly 200' (just like the one 200 of FIG. 15) can comprise a second front sprocket or toothed band 216 of smaller diameter with respect to the toothed band 215'. The small front sprocket 216 can be of the type illustrated with reference to the right crank arm assemblies of FIGS. 1 to 4, or else a toothed band similar to the toothed band 215', coupled with the crank arm 205' in the same way as the toothed band 215'.

In all of the embodiments described and illustrated, the small front sprocket 15 is coupled with the right crank arm 5 in a conventional way, i.e. contacting just the outer side. However, an embodiment is foreseen in which the coupling between the small front sprocket 15 and the crank arm 5 is the same as that described for the big front sprocket 10, i.e. contacting both the outer side and the inner side.

Numerous variants of the right crank arm 5 are possible, for example the position of the contact elements at the outer side and at the inner side of the big front sprocket can be inverted with respect to the coupling portions, thus performing their contact function in different angular positions of pedaling. The illustrated example is that in which the contact elements counteract the twisting of the front sprocket in the most critical condition, i.e. when the pedal has passed the vertical to begin a new descent, since this is the point at which the cyclist exerts the maximum thrust. The contact surfaces can also face each other and therefore are at an identical angular position.

What is claimed is:

1. A bicycle right crank arm assembly comprising:
   a right crank arm including a body portion and at least two coupling arms that are integral with said body portion, and each of the at least two coupling arms includes an elongated, radially extending portion, the right crank arm further including a first crank arm contact element that extends circumferentially from said elongated, radially extending portion of a first one of said at least two coupling arms, said first crank arm contact element defined at a first radial distance and extending along an arc of circumference having a predetermined angular extension of less than 360°, a circumferential gap is defined between said first crank arm contact element and a second one of said at least two coupling arms at a radial distance which is at least equal to the first radial distance,
   a first annular element, of a first predetermined size, having at least one first coupling portion directly coupled with at least one of said at least two coupling arms, said first annular element including at least one first annular element contact element that is dimensioned to mate with said first crank arm contact element, and
   at least one second annular element, of a smaller size than the predetermined size of said first annular element, coupled with said crank arm,
   wherein said first annular element comprises a toothing that extends radially towards the outside along a primitive circumference having a predetermined diameter, wherein said at least one first coupling portion is entirely contained in a first area extending radially towards the outside starting from an ideal circumference having a diameter at least equal to ⅔ of said predetermined diameter.

2. Crank arm assembly according to claim 1, wherein said ideal circumference has a diameter at least equal to ¾ of said predetermined diameter.

3. Crank arm assembly according to claim 1, wherein said ideal circumference has a diameter at least equal to ⅘ of said predetermined diameter.

4. Crank arm assembly according to claim 1, wherein said ideal circumference has a diameter at least equal to ⅚ of said predetermined diameter.

5. Crank arm assembly according to claim 1, wherein said ideal circumference has a diameter at least equal to 6/7 of said predetermined diameter.

6. Crank arm assembly according to claim 1, wherein said at least one first coupling portion is defined by at least one first coupling element that extends radially cantilevered from a radially inner surface of said first annular element up to said ideal circumference.

7. Crank arm assembly according to claim 6, wherein said at least one first annular element contact element is structurally distinct from said at least one first coupling element, said at least one first annular element contact element extending radially cantilevered from said radially inner surface and being entirely contained in said first area.

8. Crank arm assembly according to claim 7, wherein said at least one first annular element contact element extends from said inner surface at an angular position of said first annular element different to that of said at least one first coupling element.

9. Crank arm assembly according to claim 7, wherein said at least one first annular element contact element extends along a non-radial direction with respect to a rotational axis of said first annular element about which the annular element rotates.

10. Crank arm assembly according to claim 7, wherein said first annular element comprises a plurality of first coupling elements and said at least one first annular element contact element extends circumferentially without structural interruption between two adjacent coupling elements of said plurality of first coupling elements.

11. Crank arm assembly according to claim 7, wherein said crank arm has an inner side intended, in use, to face towards a frame of the bicycle and an outer side opposite said inner side, wherein said at least one first annular element contact element contacts said crank arm on one of said sides.

12. Crank arm assembly according to claim 11, wherein said first annular element comprises at least one second annular element contact element that contacts said crank arm on the other of said sides.

13. Crank arm assembly according to claim 1, wherein said angular extension is greater than 15°.

14. Crank arm assembly according to claim 1, wherein said angular extension is between 15° and 100°.

15. Crank arm assembly according to claim 1, wherein said angular extension is between 30° and 75°.

16. Crank arm assembly according to claim 1, wherein said first annular element comprises at least one abutment surface that allows correct angular positioning of said crank arm with respect to said first annular element.

17. Crank arm assembly according to claim 16, wherein said crank arm has an inner side intended, in use, to face towards a frame of the bicycle and an outer side opposite said inner side, said at least one second annular element contact element contacts said crank arm on one of said sides, said first annular element comprises at least one third annular element contact element that contacts said crank arm on the other of said sides, and said at least one abutment surface is defined at least partially in said at least one third annular element contact element.

18. Crank arm assembly according to claim 1, wherein said first annular element is coupled with at least one coupling arm of said at least two coupling arms at a first coupling portion of said at least one coupling arm and said at least one second annular element is coupled with said at least one coupling arm at at least one second coupling portion of said at least one coupling arm different from said first coupling portion of said at least one coupling arm.

19. Crank arm assembly according to claim 18, wherein said first coupling portion of said at least one coupling arm is defined at a first circumference having its center at a rotational axis of said crank arm and said at least one second coupling portion of said at least one coupling arm is defined at at least one second circumference concentric to said first circumference and having a different diameter to that of said first circumference.

20. Crank arm assembly according to claim 19, wherein said at least one first coupling portion of said at least one coupling arm is defined along at least one first substantially radial direction with respect to said rotation axis of the crank arm and said at least one second coupling portion of said at least one coupling arm is defined along at least one second substantially radial direction of said crank arm at a different radial length to said first substantially radial direction of said crank arm.

21. Crank arm assembly according to claim 18, wherein said at least two coupling arms include at least two first coupling portions, each at a respective one of said at least two coupling arms, arranged at a first predetermined angular distance one from the other and at least two second coupling portions, each at a respective one of said at least two coupling arms, arranged at a second predetermined angular distance one from the other, said second predetermined angular distance being less than said first predetermined angular distance.

22. Crank arm assembly according to claim 1, wherein said first area is a first annular area located between said ideal circumference and a second ideal circumference arranged at least 1 mm radially towards the inside with respect to said toothing.

23. Crank arm assembly according to claim 22, wherein said first annular area has an inner diameter greater than or equal to 150 mm and an outer diameter less than or equal to 180 mm.

24. Crank arm assembly according to claim 23, wherein said first annular area has an inner diameter greater than or equal to 160 mm and an outer diameter less than or equal to 170 mm.

25. Crank arm assembly according to claim 22, wherein said first annular element is coupled with said at least two coupling arms at a first coupling portion of each of said at least two coupling arms and said at least one second annular element is coupled with said at least two coupling arms at at least one second coupling portion of each of said at least two coupling arms different from said at least one first coupling portion, and further comprising a second annular area containing said at least one second coupling portion of each of said two coupling arms and having an inner diameter greater than or equal to 100mm and an outer diameter less than or equal to 130 mm.

26. Crank arm assembly according to claim 25, wherein said second annular area has an inner diameter greater than or equal to 110 mm and an outer diameter less than or equal to 120 mm.

27. Crank arm assembly according to claim 1, wherein said at least one coupling portion is defined by a radially inner surface of said annular element.

28. Crank arm assembly according to claim 27, wherein said radially inner surface is arranged at least 1 mm radially towards the inside with respect to said toothing.

29. Crank arm assembly according to claim 27, wherein said at least one coupling portion comprises at least one surface portion extending radially.

30. Crank arm assembly according to claim 27, wherein said at least one coupling portion comprises at least one cylindrical surface portion extending around a rotation axis of said assembly.

31. Crank arm assembly according to claim 1, wherein said crank arm comprises an arm of predetermined length L, the radial extension of the elongated, radially extending portion of each of said at least two coupling arms is defined by a circumference of diameter T", wherein L/T" is between 0.7 and 1.

32. Crank arm assembly according to claim 31, wherein the ratio L/T" is between 0.8 and 0.9.

33. Crank arm assembly according to claim 1, wherein said crank arm is made from a light metallic material or from a composite material.

34. A bicycle right crank arm assembly comprising:
a right crank arm,
a first annular element, of a first predetermined size, directly coupled with said crank arm at at least one first coupling portion of said first annular element, and
at least one second annular element, of a smaller size than the predetermined size of said first annular element, coupled with said crank arm wherein said first annular element comprises a toothing that extends radially towards the outside along a primitive circumference having a predetermined diameter, wherein said at least one first coupling portion is entirely contained in a first area extending radially towards the outside starting from an ideal circumference having a diameter at least equal to ⅔ of said predetermined diameter, said at least one first coupling portion is defined by at least one first coupling element that extends radially cantilevered from a radially inner surface of said first annular element up to said ideal circumference, said first annular element comprises at least one first annular element contact element with said crank arm which is structurally distinct from said at least one first coupling element, said at least one first annular element contact element extending radially cantilevered from said radially inner surface and being entirely contained in said first area, said crank arm has an inner side intended, in use, to face towards a frame of the bicycle and an outer side opposite said inner side, said at least one first annular element contact element contacts said crank arm on one of said sides, wherein said first annular element comprises at least one second annular element contact element that contacts said crank arm on the other of said sides, said at least one second annular element contact element extends cantilevered from said inner surface of said first annular element on the opposite side to said at least one first annular element contact element with respect to said at least one first coupling element.

35. Crank arm assembly according to claim 34, wherein said at least one second annular element contact element extends from said inner surface of said first annular element along a substantially radial direction.

36. Crank arm assembly according to claim 34, wherein said at least one second annular element contact element is arranged in a position that precedes said at least one first coupling portion with reference to the counter-clockwise direction of rotation of the crank arm assembly during pedaling and said at least one first annular element contact element is arranged in a position that follows said at least one first coupling portion with reference to said direction of rotation.

37. Crank arm assembly according to claim 34, wherein said at least one first annular element contact element and at least one second annular element contact element are defined in a body portion of said first annular element extending radially cantilevered from said inner surface and comprising said at least one first coupling element.

38. Crank arm assembly according to claim 34, wherein said at least one second annular element contact element is defined by a respective body portion of said first annular element extending radially cantilevered from said inner surface, said respective body portion not comprising said at least one first coupling element.

39. Crank arm assembly according to claim 34, comprising a plurality of first annular element contact elements and a plurality of second annular element contact elements.

40. Crank arm assembly according to claim 34, comprising at least one first crank arm element that cooperates with said at least one first annular element contact element and at least one second crank arm element that cooperates with said at least one second annular element contact element.

41. Crank arm assembly according to claim 40, wherein said at least one first crank arm element has an angular extension substantially equal to that of said at least one first annular element contact element.

42. A bicycle right crank arm comprising:
an arm of predetermined length L and at least two coupling arms, each of said at least two coupling arms including at least one coupling portion, and a first crank arm contact element defined at a first radial distance and extending circumferentially from said at least one coupling portion of a first one of said at least two coupling arms along an arc of circumference having a predetermined angular extension of less than 360°, a circumferential gap is defined between said first crank arm contact element and a second one of said at least two coupling arms at a radial distance which is at least equal to the fist radial distance, and a toothed annular element extending substantially radially with respect to a rotation axis of said crank arm, said toothed annular element having at least one first coupling portion directly coupled with said coupling portion of said crank arm, said toothed annular element including at least one first annular element contact element that is dimensioned to mate with said first crank arm contact element, wherein the radial extension of said at least two coupling arms is defined by an ideal circumference of diameter T", wherein the ratio L/T" is between 0.7 and 1.

43. Crank arm according to claim 42, wherein the ratio L/T" is between 0.8 and 0.9.

44. Crank arm according to claim 43, comprising first coupling portions with the annular element arranged on the at least two coupling arms at a first annular area having an inner diameter greater than or equal to 150 mm and an outer diameter less than or equal to 180 mm.

45. Crank arm according to claim 44, wherein said first annular area has an inner diameter greater than or equal to 160 mm and an outer diameter less than or equal to 170 mm.

46. Crank arm according to claim 42, comprising second coupling portions with a second annular element arranged on the at least two coupling arms at a second annular area having an inner diameter greater than or equal to 100 mm and an outer diameter less than or equal to 130 mm.

47. Crank arm according to claim 46, wherein said second annular area has an inner diameter greater than or equal to 110 mm and an outer diameter less than or equal to 120 mm.

* * * * *

UNITED STATES PATENT AND TRADEMARK OFFICE
CERTIFICATE OF CORRECTION

PATENT NO. : 9,162,729 B2  
APPLICATION NO. : 14/041748  
DATED : October 20, 2015  
INVENTOR(S) : Maurizio Valle and Paolo Pasqua It is certified that error appears in the above-identified patent and that said Letters Patent is hereby corrected as shown below:

On the Title Page, item (73), under "Assignee", in Column 1, Line 1, delete "Campagno S.r.l.," and insert -- Campagnolo, S.r.l., --, therefor.

IN THE SPECIFICATION

At Column 6, Line 66, delete "LIT"" and insert -- L/T" --, therefor.
At Column 8, Line 39, delete "plane H" and insert -- plane II --, therefor.
At Column 8, Line 60, delete "distance p" and insert -- distance $\mu$ --, therefor.
At Column 9, Lines 43-44, delete "second contact 40 element" and insert -- second contact element 35 --, therefor.
At Column 11, Line 10, delete "inner surface 14" and insert -- inner surface 13 --, therefor.
At Column 11, Line 21, delete "T>T'≤aT," and insert -- T>T'≥aT, --, therefor.
At Column 13, Line 23, delete "band 205" and insert -- band 215 --, therefor.

IN THE CLAIMS

At Column 14, Line 33, in Claim 1, delete "2/3of" and insert -- 2/3 of --, therefor.
At Column 14, Line 36, in Claim 2, delete "3/4of" and insert -- 3/4 of --, therefor.
At Column 14, Line 39, in Claim 3, delete "4/5of" and insert -- 4/5 of --, therefor.
At Column 14, Line 42, in Claim 4, delete "5/6of" and insert -- 5/6 of --, therefor.
At Column 14, Line 45, in Claim 5, delete "6/7of" and insert -- 6/7 of --, therefor.
At Column 16, Line 27, in Claim 25, delete "100mm" and insert -- 100 mm --, therefor.
At Column 17, Line 4, in Claim 34, delete "2/3of" and insert -- 2/3 of --, therefor.

Signed and Sealed this  
Fifteenth Day of March, 2016

Michelle K. Lee  
*Director of the United States Patent and Trademark Office*